US011980181B2

(12) United States Patent
Sporrer et al.

(10) Patent No.: US 11,980,181 B2
(45) Date of Patent: May 14, 2024

(54) AGRICULTURAL SPRAYER ACTIVE BOOM CENTER FRAME POSITIONING SYSTEM

(71) Applicants: Deere & Company, Moline, IL (US); Iowa State University Research Foundation, Inc., Ames, IA (US)

(72) Inventors: Adam D. Sporrer, Ankeny, IA (US); Kyle R. Blaylock, Ankeny, IA (US); Matthew J. Darr, Ames, IA (US); Robert McNaull, Ames, IA (US); Kevin L. Ehrecke, Ames, IA (US)

(73) Assignees: Deere & Company, Moline, IL (US); Iowa State University Research Foundation, Inc., Ames, IA (US)

( * ) Notice: Subject to any disclaimer, the term of this patent is extended or adjusted under 35 U.S.C. 154(b) by 383 days.

(21) Appl. No.: 17/178,526

(22) Filed: Feb. 18, 2021

(65) Prior Publication Data

US 2021/0274773 A1 Sep. 9, 2021

Related U.S. Application Data

(60) Provisional application No. 62/985,132, filed on Mar. 4, 2020.

(51) Int. Cl.
*A01B 63/00* (2006.01)
*A01B 63/02* (2006.01)
(Continued)

(52) U.S. Cl.
CPC ......... *A01M 7/0089* (2013.01); *A01B 63/008* (2013.01); *A01B 63/02* (2013.01);
(Continued)

(58) Field of Classification Search
CPC .... A01B 63/008; A01B 63/02; A01M 7/0042; A01M 7/0057
See application file for complete search history.

(56) References Cited

U.S. PATENT DOCUMENTS 8,302,944 B1 11/2012 Porumamilla et al.
9,763,437 B2 9/2017 Schnaider et al.
(Continued)

FOREIGN PATENT DOCUMENTS

EP 1444894 A1 8/2004

OTHER PUBLICATIONS

Extended European Search Report and Written Opinion issued in European Patent Application No. 21159634.1, dated Jul. 13, 2021, in 09 pages.

*Primary Examiner* — Tuongminh N Pham
(74) *Attorney, Agent, or Firm* — Tucker Ellis LLP; Michael G. Craig; Heather M. Barnes

(57) ABSTRACT

One or more techniques and/or systems are disclosed for a center frame positioning method for an agricultural sprayer. The method comprises activating a center frame positioning system and collecting and processing position data related to a position of a suspended center frame in the center frame positioning system. The method further comprises evaluating the position data to determine whether any adjustment to the position of the suspended center frame is needed and controlling actuator force in at least one actuator to adjust the position of the suspended center frame based on the evaluating the position data.

17 Claims, 15 Drawing Sheets

(51) Int. Cl.
*A01C 23/00* (2006.01)
*A01C 23/04* (2006.01)
*A01M 7/00* (2006.01)
*B05B 12/12* (2006.01)
*G05B 19/05* (2006.01)

(52) U.S. Cl.
CPC .......... *A01C 23/007* (2013.01); *A01C 23/047* (2013.01); *A01M 7/0042* (2013.01); *A01M 7/0057* (2013.01); *B05B 12/126* (2013.01); *G05B 19/05* (2013.01); *G05B 2219/15064* (2013.01)

(56) References Cited

U.S. PATENT DOCUMENTS

| | | | |
|---|---|---|---|
| 10,245,914 B2 | 4/2019 | Kerner et al. | |
| 2010/0253017 A1* | 10/2010 | VanRaaphorst | B60G 17/0155 280/5.504 |
| 2013/0345937 A1* | 12/2013 | Strelioff | A01D 41/141 701/50 |
| 2014/0197297 A1* | 7/2014 | Ito | A01B 63/1006 248/550 |
| 2018/0110213 A1 | 4/2018 | Oberheide et al. | |
| 2019/0357520 A1 | 11/2019 | Redden et al. | |
| 2020/0290635 A1* | 9/2020 | Stanhope | A01B 73/065 |

\* cited by examiner

AGRICULTURAL SPRAYER ACTIVE BOOM CENTER FRAME POSITIONING SYSTEM

CROSS-REFERENCE TO RELATED APPLICATION(S)

This application claims priority to U.S. Ser. No. 62/985,132, entitled AGRICULTURAL SPRAYER ACTIVE BOOM CENTER FRAME POSITIONING SYSTEM, filed Mar. 4, 2020, which is incorporated herein by reference.

BACKGROUND

Agricultural sprayers are fully integrated, mechanical systems used to apply materials, such as water, herbicides, pesticides, and fertilizers, onto land and crops. To provide the uniform distribution of materials agricultural sprayers have a boom height control system. The boom height control system is an active system that monitors the position of the boom relative to the ground and then makes corresponding adjustments to the height of the boom in an effort to maintain a constant boom level above the crops or field. The boom height system can be very sensitive to dynamic field conditions (e.g., changing terrain, uneven surfaces, and/or inclines such as hills).

Sensitivity to dynamic field conditions is often a result of the mechanical structure of agricultural sprayer booms. Agricultural sprayer booms have a center frame suspended from the agricultural sprayer utilizing some type of mechanical suspension system. The suspended center frame is capable of pendulum style rotational movement with boom wings attached to this suspended, rotating center frame. The performance of agricultural sprayers having mechanical suspension systems suffers in the presence of dynamic field conditions. For dynamic field conditions, it is desirable to have a small amount of spring return and dampening to fully decouple the boom from the chassis. On the other hand, during dynamic boom cylinder movements, it is desirable to have high damping and spring force to stiffen and center the boom suspension.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation there is provided a center frame positioning system for an agricultural sprayer vehicle. The center frame positioning system comprises one or more controllable, variable pressure actuators that are each configured to operably exert a force on a suspended center frame of the agricultural sprayer vehicle, wherein a sprayer boom is attached to the suspended center frame. The center frame positioning system further comprises one or more sensors that provide center frame position data (e.g., real-time data) indicative of a detected position of the suspended center frame in real time; and a control device that receives the center frame position data and provides one or more actuator adjustment commands based at least upon the received center frame position data. The force exerted on the suspended center frame by the one or more actuators can be adjusted (e.g., in real-time) as a result of the one or more actuator adjustment commands. The adjustment of the force exerted on the suspended center frame results in adjustment of a distance of the sprayer boom from the ground.

In another implementation, there is provided a center frame positioning system for an agricultural sprayer vehicle. The center frame positioning system comprises a first actuator disposed on a first side of a suspended center frame of an agricultural sprayer vehicle, and a second actuator disposed on a second side of the suspended center frame, the first actuator configured to operably apply a first force to the suspended center frame to rotate the suspended center frame in a first direction, and the second actuator configured to operably apply a second force to the suspended center frame to rotate the suspended center frame in a second direction, wherein one or more sprayer boom arms are attached to the suspended center frame and operably extended over the ground. The center frame positioning system further comprises a center frame position sensor operably detecting the real time rotational position of the suspended center frame relative to the vehicle, the position sensor. The center frame positioning system further comprises a central controller comprising a computer processor and computer data storage, the central controller operably processing data indicative of the detected real time rotational position of the suspended center frame using programmable logic stored in the computer data storage to generate an actuator adjustment command for the first actuator and the second actuator, the actuator adjustment command resulting in an adjustment of the first force applied by the first actuator and the second force applied by the second actuator. The adjustment of the first force applied by the first actuator and the adjustment of the second force applied by the second actuator results in an adjustment of a distance of the one or more sprayer boom arms from the ground.

In another implementation, there is provided a center frame positioning method for an agricultural sprayer. The method comprises activating a center frame positioning system, the center frame positioning system comprising one or more controllable, variable pressure actuators that each operably exert a force on a suspended center frame of an agricultural sprayer vehicle, wherein a sprayer boom is attached to the suspended center frame; using a central controller, comprising a processor and memory, to collect and process position data indicative of a rotational position of the suspended center frame relative to the agricultural sprayer vehicle, wherein the position data is operably provided by one or more position sensors; using programmable logic in the central controller to evaluate the position data to determine whether an adjustment to the position of the suspended center frame is needed; and controlling actuator force provided by at least one of the one or more actuators to adjust the position of the suspended center frame based on the evaluating the position data.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
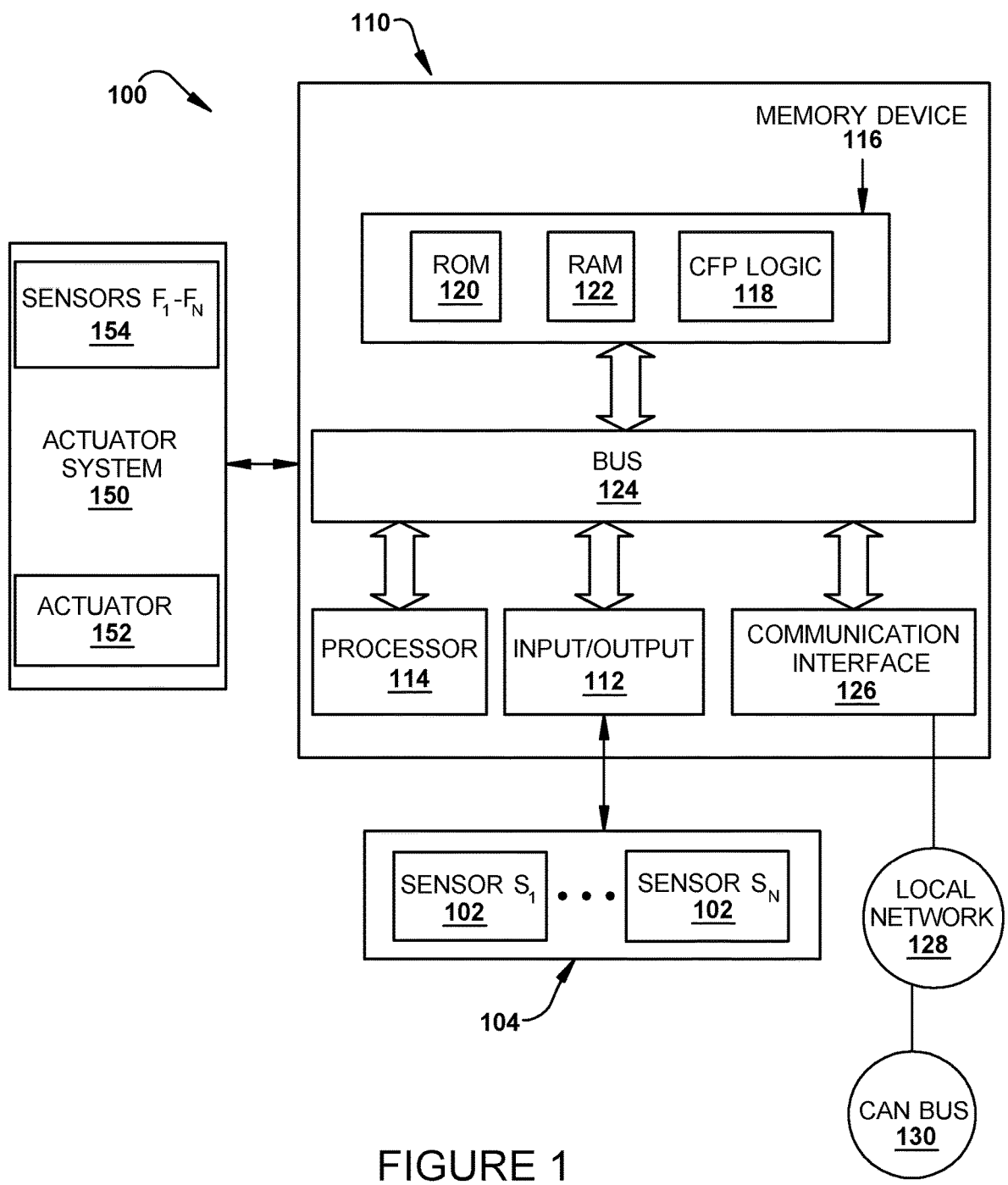
FIG. 1 is a schematic diagram illustrating one implementation of an example center frame positioning (CFP) system for an agricultural sprayer vehicle in accordance with this disclosure.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

Provided herein is a center frame positioning (CFP) system and corresponding techniques for repositioning a center frame in an agricultural sprayer vehicle by actively controlling variable pressure actuators to dynamically adjust the force exerted on the suspended center frame by the actuators in response to in-situ field conditions.

Purely mechanical suspension systems have to balance opposing design goals of a small amount of return and dampening for dynamic filed conditions, and high dampening and spring force during dynamic movement. Thus, these system must settle on a non-optimized scenario which limits the overall suspension performance of the boom. For example, current mechanical spring systems are ill-equipped to apply the necessary force to re-center the suspended center frame of the sprayer boom. This is because mechanical spring systems only have one applied spring rate and the systems are generally optimized to perform under steady, non-dynamic field conditions.

Thus, a system or method can be devised that is capable of dynamically and actively adjusting pressure in a spring depending on the actual use situation by optimizing the spring rate according to sensed use conditions (e.g., in-situ, real-time conditions). Moreover, such a system and method can be used to maintain boom height more consistently and more precisely under a variety of operating conditions to provide for more uniform application of materials to fields and crops.

The benefits of this disclosure should be apparent from the description. One or more techniques and systems are described herein for actively adjusting a variable actuator force and dampening of a CFP system based on operable field conditions. That is, the boom sprayer may encounter a variety of field conditions that could affect the height of a boom wing to the ground, and the CFP system can detect these conditions while in use. As an example, the conditions may be detected in real-time (e.g., at the time, or approximate to the time, of use and/or operation), operable to determine in-situ conditions. Data indicative of the in-situ, detected conditions can be used to adjust the variable force exerted by one or more actuators on a suspended center frame and to adjust the dampening properties of the CFP system to provide for improved height adjustment of the boom sprayer to the ground, which can improve sprayed material deployment results. These adjustments may be performed during operation to adjust to in-situ conditions, for example, in real-time (e.g., at the time, or approximate to the time, of use and operation).

FIG. 1 is a schematic diagram illustrating an example center frame positioning (CFP) system 100 for an agricultural sprayer vehicle in accordance with this disclosure. The CFP system 100 comprises a control device 110, such as a programmable controller, which is operatively coupled with one or more sensors $S_1$-$S_N$ collectively 102, and an actuator system 150 that is operatively coupled with the control device 110. In particular, the control device 110 is in operative electrical communication with at least one actuator 152, such as a controllable, variable pressure actuator, via the actuator system 150. Each actuator 152 is operable to exert a force on a suspended center frame of an agricultural sprayer vehicle in order to reposition (e.g., re-center) the suspended center frame and, by extension, a sprayer boom that is attached to the suspended center frame.

The CFP system 100 can be configured to actively adjust the position of the suspended center frame of the agricultural sprayer vehicle in response to detected operating conditions in accordance with this disclosure. The CFP system 100 is configured to determine whether the suspended center frame should be repositioned and, if so, to control adjustment of the center frame position by monitoring conditions such as, for example, in-field conditions and the vehicle state.

The control device 110 automatically controls operation of the one or more actuators 152 of the actuator system 150. The control device 110 may be of any type capable of collecting, processing, and evaluating center frame position data indicative of a position of the suspended center frame. In some implementations, the control device 110 provides one or more actuator adjustment commands (e.g., control signals) to the actuator system 150 for controlling each of the variable pressure actuators 152 based on the center frame position data. In some implementations, the control device 110 provides one or more actuator adjustment commands (e.g., control signals) which control the opening and closing of valves (e.g., exhaust valves and inflate valves in an air spring) within an actuator (e.g., 152) or in fluid communication with an actuator.

In some implementations, the one or more sensors $S_1$-$S_N$ monitor one or more conditions (e.g., in-field conditions, vehicle state, and vehicle specifications) for determining the position of the suspended center frame and provide center frame position data indicative of a detected position of the suspended center frame in operation. As an example, the center frame position data monitored by the one or more sensors $S_1$-$S_N$ can comprise one or more of the following: vehicle heading (e.g., determined by steering angle, and/or vehicle location and direction), vehicle turn rate, vehicle speed, vehicle chassis roll, boom roll of the sprayer boom, sprayer boom wing height, output force in a variable pressure actuator (e.g., air pressure in an air spring), and lift actuation provided by the one or more actuators 152. The one or more sensors $S_1$-$S_N$ are configured to continuously monitor center frame position data such as, for example, by taking readings multiple times per second.

The one or more sensors $S_1$-$S_N$ are configured to generate a signal representative of the monitored center frame position. In some implementations, the one or more sensors $S_1$-$S_N$ can be located on the agricultural sprayer vehicle and/or the sprayer boom. In some implementations, the one or more sensors $S_1$-$S_N$ may be included in a sensor bank 104.

The CFP system 100 can comprise any type of sensor capable of monitoring a position of a suspended center frame, or portions thereof, and associated components, in real time. In some implementations, the CFP system 100 can comprise at least one inertial measurement unit (IU) sensor to capture vehicle chassis roll data for determining chassis roll rate and pitch. In some implementations, the CFP system 100 can comprise at least one linear variable differential transformer (LVDT) sensor that provides a measure of the distance of boom roll (e.g., a measure of rotation displacement of the boom) of the sprayer boom (e.g., the distance value is calibrated). As an example, the boom roll data can include collecting and processing the boom wing height at the tips of the sprayer boom.

The control device 110 is operatively coupled with the one or more sensors $S_1$-$S_N$ and the control device 110 is in operative electrical communication with the actuator system 150, the one or more actuators 152, and the one or more sensors $F_1$-$F_N$, collectively 154. In some implementations, the control device 110 comprises a processor 114, a memory device 116 operatively coupled with the processor 114, and center frame position (CFP) logic 118 stored in the memory device 116. The control device 110 (e.g., a programmable controller) can comprise an input/output 112 for receiving, as input, the center frame position data from the one or more sensors $S_1$-$S_N$ and for providing, as output, one or more actuator adjustment commands based at least upon the received center frame position data. In some implementations, the control device 110 receives signals directly from the sensors $S_1$-$S_N$, so the CFP system 100 can immediately determine the position of the suspended center frame without having to rely on derived measurements. The control device 110 can receive, as input, center frame position data in the form of actuator force exerted on a suspended center frame (e.g., pressure) from one or more sensors $F_1$-$F_N$.

The control device 110 can be configured to control the one or more actuators 152 of the actuator system 150. In some implementations, the control device 110 can be programmed to automatically provide one or more actuator adjustment commands to the one or more actuators 152 in the actuator system 150. As an example, a control device 110, such as a programmable controller, can provide an actuator adjustment command setting a target force to be exerted on the suspended center frame by the one or more actuators 152 (e.g., controllable, variable pressure actuators) in the actuator system 150. In this manner, the control device 110 can control the force exerted on the suspended center frame by the one or more variable pressure actuators 152.

In some implementations, the control device 110 evaluates whether to provide an actuator adjustment command to adjust the position of the center frame based at least on the control device 110 performing comparisons. As an example, the control device 110 may perform one or more of: comparing the vehicle speed to a predetermined vehicle speed threshold; comparing the vehicle chassis roll moving average to a predetermined vehicle chassis roll threshold; comparing the boom roll moving average to a predetermined boom roll threshold; comparing the vehicle heading to a predetermined vehicle heading threshold; and comparing the vehicle turn rate to a predetermined vehicle turn rate threshold.

The control device 110 can be programmed to collect and process center frame position data to determine whether the position of the suspended center frame needs adjustment and, if so, to control the adjustment, or repositioning, of the suspended center frame. The control device 110 is suitable for executing implementations of one or more software systems or modules that are executable to provide a CFP system 100 and method for controlling the position of the suspended center frame by controlling the force exerted on the suspended center frame by one or more actuators 152, such as variable pressure actuators. As an example, the control device 110 can send a control signal to the variable actuators setting a target force for each respective variable pressure actuator to exert on a suspended center frame.

In some implementations, the control device 110 can receive feedback from the actuator system 150 in the form of a signal, generated by the actuator force detecting sensors 154, indicating the force exerted on the suspended center frame by the variable pressure actuator. The force exerted on the suspended center frame by the one or more actuators 152 (e.g., variable pressure actuators) is adjusted (e.g., in real-time) as a result of the one or more actuator adjustment commands provided by the control device 110 (e.g., programmable controller). Adjusting the force exerted on the suspended center frame results in adjusting the distance of the sprayer boom from the ground.

As will be described in more detail below, the control device 110 may also be configured to compare the target output force of the variable actuator to the measured output force of the variable actuator. The center frame position data may be processed directly by a control device 110 in the CFP system 100 or may be integrated into a controller already existing in the agricultural sprayer vehicle. In some implementations, the control device 110 and, in particular a communication interface 126, can be used to report the position of the suspended center frame to a local network 128 and CAN bus 130. While the local network 128 and the CAN bus 130 are described and illustrated, one of the local network 128 or the CAN bus 130 may be utilized, or both may be utilized. It is anticipated that other communication systems, networks and devices may be used to perform similar function for communication within the vehicle, and with coupled systems and devices, locally and/or remotely, in a wired or wireless manner.

In some implementations, the control device 110 can comprise a bus 124 or other communication mechanism for communicating information (e.g., vehicle heading data) and a processor 114 coupled with the bus 124 for processing information. The control device 110 comprises a memory device 116 (e.g., main memory), which may comprise random access memory (RAM) 122 or other dynamic storage devices for storing information and instructions (e.g., CFP logic 118) to be executed by the processor 114, and read only memory (ROM) 120 or other static storage device for storing static information and instructions for the processor 114. The main memory 116 may be a non-volatile memory device and operable to store information and instructions executable by the processor 114.

In some implementations, the control device 110 comprises a processor 114, a memory device 116, and an input/output 112. The processor 114 can process received center frame position data and other data (e.g., actuator force data) based at least on stored CFP logic 118 (e.g., programmable logic). The memory device 116 can store the CFP logic 118 as well as center frame position data. An input-output can be used as a data communication medium for receiving and sending data. In some instances, the input/output 112 can be a communication interface. The control device 110 can be programmed to control actuator force by setting the target force to be exerted by the one or more actuators 152, as will be described in more detail below.

The actuator system 150 can comprise one or more actuators 152 that each are configured to operably exert a force on a suspended center frame of the agricultural sprayer vehicle. In some implementations, the actuator system 150 comprises one or more controllable, variable pressure actuators 152. As an example, the one or more variable pressure actuators 152 can apply force to the suspended center frame of the agricultural sprayer vehicle to adjust the position of the suspended center frame (e.g., re-center) of the agricultural sprayer vehicle.

In some implementations, the one or more variable pressure actuators 152 are actively controlled (e.g., such as automatically by the control device 110) to dynamically adjust the actuator output force (e.g., spring force) during operation by optimizing the spring rate according to detected conditions (e.g., varying in-field conditions). In some implementations, the actuator 152 is an air spring that supplies variable force in the form of air pressure. As an example, the variable pressure air springs can quickly change air pressure and, by extension, the output force (e.g., air pressure) on the suspended center frame. In other implementations, the actuator can comprise a hydraulic actuator (e.g., hydraulic cylinder), a pneumatic actuators (e.g., pneumatic cylinder), an electric linear actuator, a hydraulic motor, and an electric motor.

The actuator system 150 can comprise one or more sensors $F_1$-$F_N$ collectively at 154, which can also be referred to as actuator force detection sensors. The one or more sensors $F_1$-$F_N$ are configured to detect actuator force exerted on a suspended center frame of an agricultural sprayer vehicle and to generate a corresponding signal representative of the detected force (e.g., or pressure).

Figure 7:
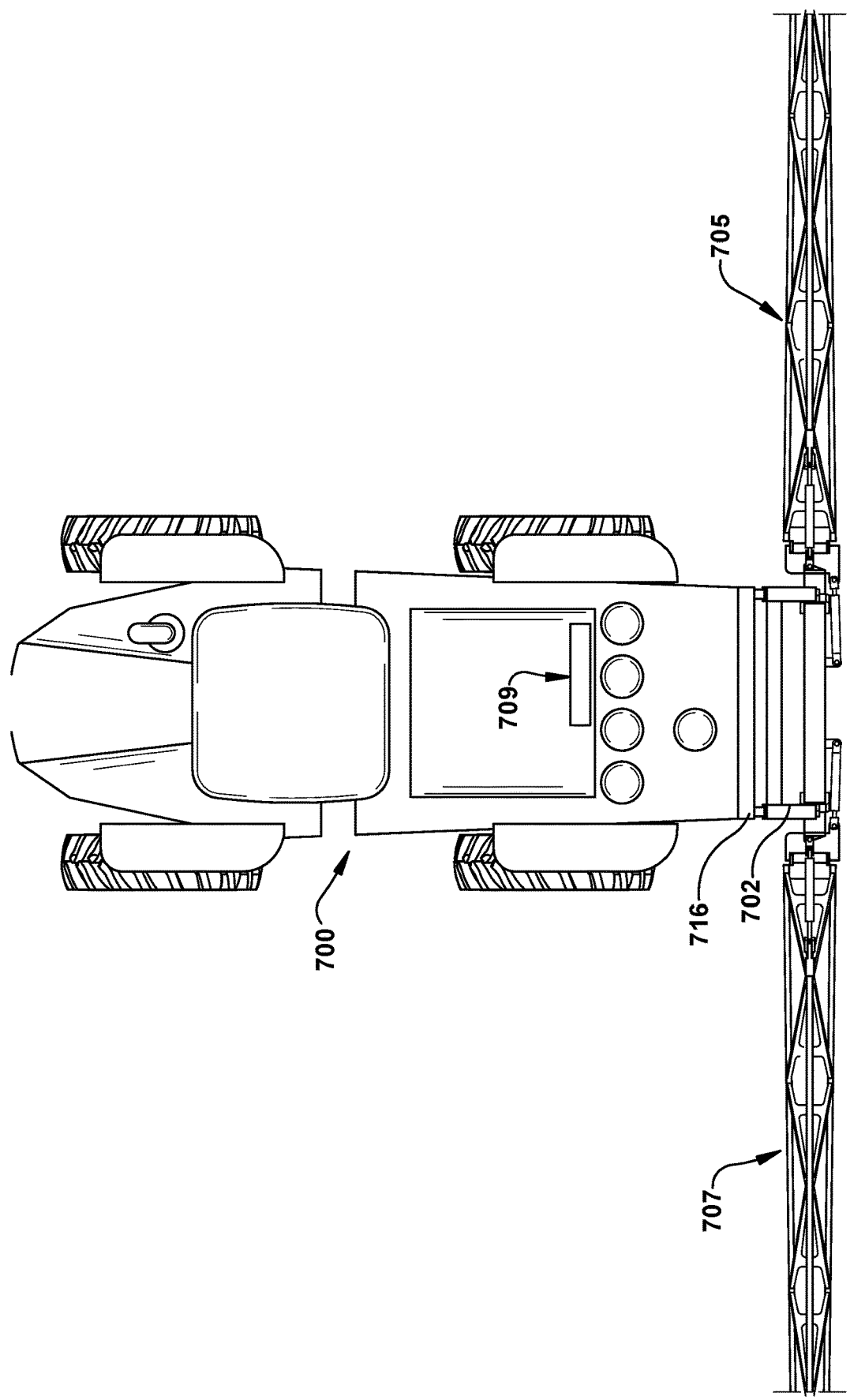
FIG. 7 is a perspective view of an agricultural sprayer vehicle equipped with a CFP system to adjust the position of a suspended center frame in accordance with this disclosure.

In some implementations, the CFP system 100 further comprises a user interface (709 in FIG. 7). The user interface can be disposed proximate an operator position in the agricultural sprayer vehicle. In some implementations, the user interface can be configured to operably display information indicative of the distance of the boom from the ground, and the user interface can be further configured to operably transmit data indicative of user input to the control device 110.

Figure 2A:
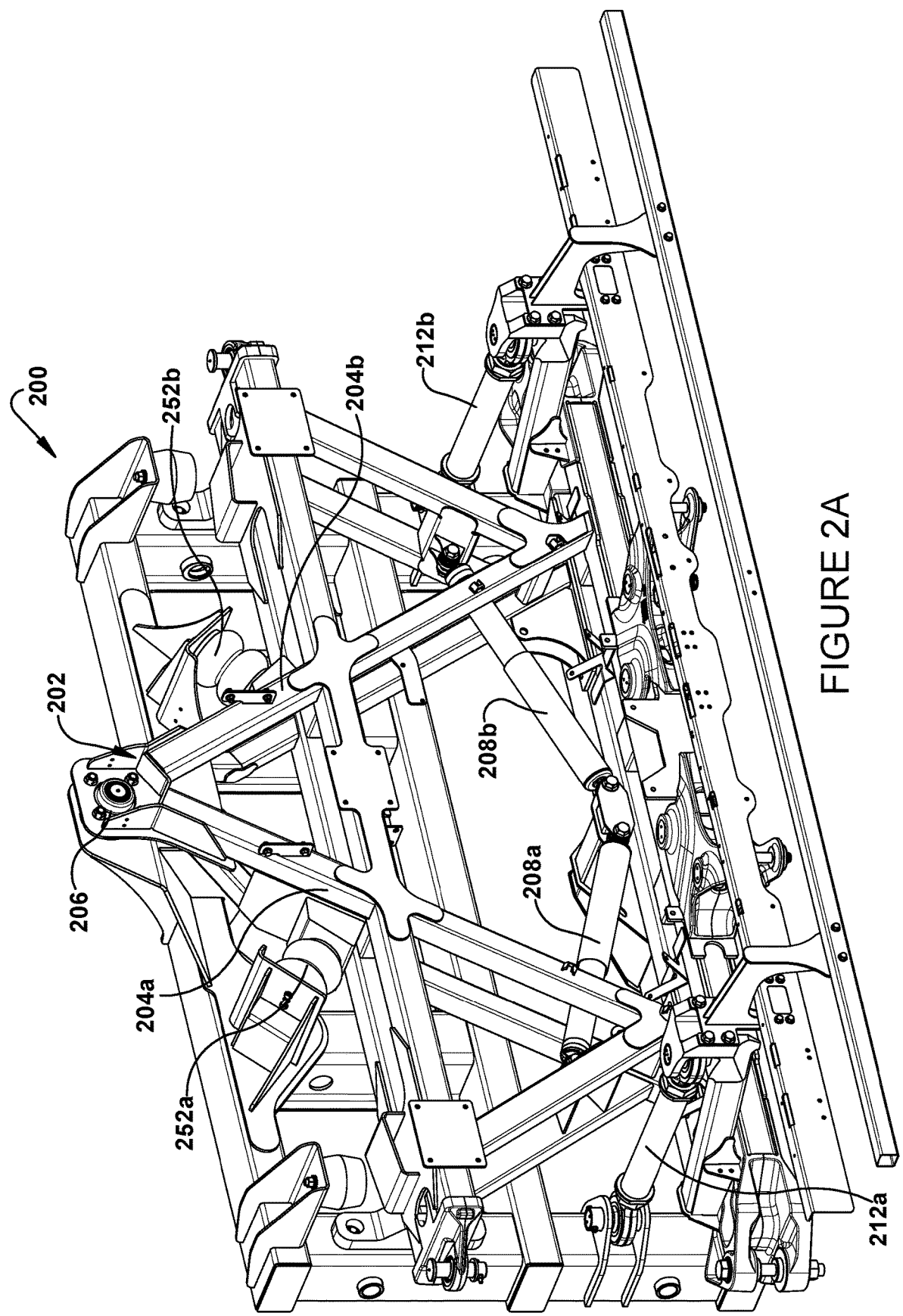
FIGS. 2A and 2B are component diagrams illustrating one implementation of an agricultural sprayer boom with a suspended center frame, as described herein.
Figure 2B:
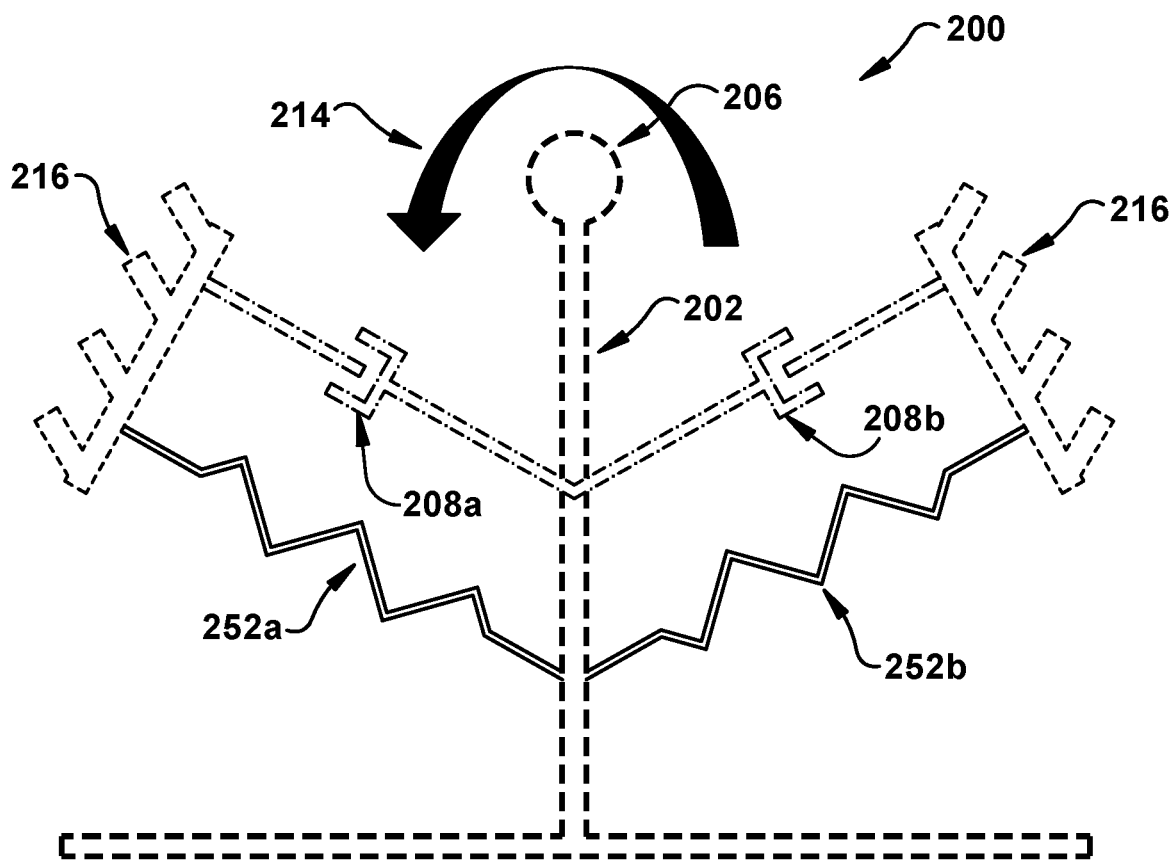

FIGS. 2A and 2B illustrate an example implementation 200 for disposing one or more actuators of a CFP system (e.g., 100) on a center frame 202 of an agricultural sprayer vehicle. In this implementation, the center frame 202 comprises an upper pivot 206, about which the center frame 202 is suspended. The suspended center frame 202 is capable of pendulum style rotational motion 214 about the upper pivot 206. The center frame 202 can further comprise a first side 204a and a second side 204b. In some implementations, the one or more actuators 252 can comprise a first actuator 252a disposed on a first side 204a of the center frame 202 and a second actuator 252b disposed on a second side 204b of the center frame 202, which may be opposed to the first side 204a. In some implementations, the center frame 202 is attached to, or formed integral with, a sprayer boom.

In some implementations, the first actuator 252a can be configured to operably apply a first force to the suspended center frame 202 to rotate the suspended center frame 202 in a first direction. The second actuator 252b can be configured to operably apply a second force to the suspended center frame 202 to rotate the suspended center frame 202 in a second direction. In this implementation, a central controller can be configured to operably process data indicative of the detected real time rotational position of the suspended center frame 202 using programmable logic stored in the main memory (e.g., computer data storage) to generate an actuator adjustment command for the first actuator 252a and the second actuator 252b.

In some implementations, one or more sprayer boom arms are attached to the suspended center frame 202 and operably extended over the ground. In this implementation, the adjustment of the first force applied by the first actuator 252a and the adjustment of the second force applied by the second actuator 252b results in an adjustment of a distance of the one or more sprayer boom arms from the ground (e.g., 513 in FIG. 5).

In some implementations, the one or more actuators 252a, 252b can comprise a controllable, variable pressure actuator such as, for example, an air spring, or a set of air springs. In this implementation, the actuators 252a, 252b comprise variable pressure air springs capable of exerting a force on the suspended center frame 202 to control movement of the suspended center frame 202 (e.g., by applying a counter force to resist movement of the suspended center frame 202 or by applying a sufficient force to reposition the suspended center frame 202). The air springs (e.g., 252a, 252b) can be any type of air spring such as air bags. In some implementations, the actuators 252a, 252b from the CFP system 100 are mounted to the center frame 202 to apply a variable force to the suspended center frame 202. The CFP system (e.g., 100) is configured to monitor and control movement of the center frame 202 by actively controlling the one or more actuators 252a, 252b to exert an adjustable force on the center frame 202.

In some implementations, one or more passive dampers 208a, 208b and one or more connection links 212a, 212b can be disposed on the center frame 202 to assist the actuators 252a, 252b in controlling movement of the center frame 202. In some implementations, the dampers 208a, 208b and air spring actuators 252a, 252b can be positioned between the suspended center frame 202 and a fixed center frame 216.

Figure 3:
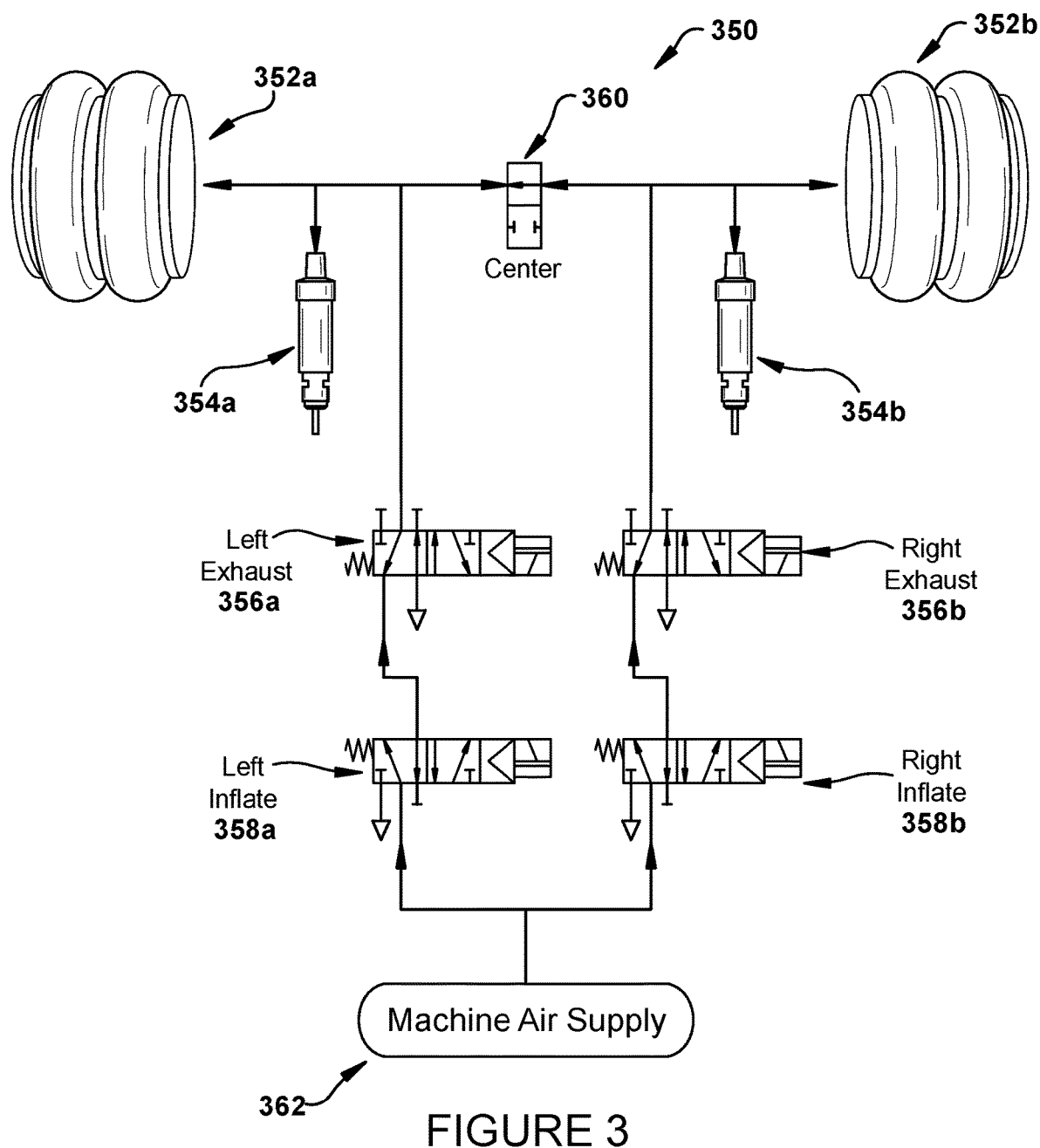
FIG. 3 is a schematic diagram illustrating one implementation of an actuator system for use in the CFP system in accordance with this disclosure.

FIG. 3 is a schematic representation of an example implementation of an actuator system 350 for use in a CFP system (e.g., 100 of FIG. 1) of an agricultural sprayer vehicle. In this implementation, the actuator system 350 comprises controllable, variable pressure actuators in the form of left and right air springs 352a, 352b. In some implementations, the air springs 352 comprise air bags. The actuator system 350 further comprises air spring pressure sensors, or air spring force detecting sensors 354a, 354b.

In this implementation, the actuator system 350 comprises a left air spring 352a and a right air spring 352b. A left air spring force detecting sensor 354a monitors air pressure in the left air spring 352a and a right air spring force detecting sensor 354b monitors air pressure in the right air spring 352b, the monitored air pressures indicative of the force exerted by each respective air spring 352a, 352b. As an example, the air spring force detecting sensors 354a, 354b can be pressure taps configured to measure air flow. The air spring force detecting sensors 354a, 354b monitor air pressure and generate a signal representative of the current air pressure in each respective air spring 352a, 352b.

The actuator system 350 of the CFP system (e.g., 100 of FIG. 1) further comprises at least one left exhaust valve 356a, for operably releasing air from the left air spring 352a to reduce the force exerted on a center frame, and at least one left inflate valve 358a, for operably receiving air into the left air spring 352a to increase the force exerted on a center frame (e.g., 204 of FIG. 2). In some implementations, the left air spring 352a comprises the at least one left exhaust valve 356a and the at least one left inflate valve 358a. In other implementations, the at least one left exhaust valve 356a and the at least one left inflate valve 358a are physically separate from, but in fluid communication with, the left air spring 352a.

The actuator system 350 of the CFP system (e.g., 100 of FIG. 1) further comprises at least one right exhaust valve 356b, for operably releasing air from the right air spring 352b to reduce the force exerted on a center frame, and at least one right inflate valve 358b, for operably receiving air into the right air spring 352b to increase the force exerted on a center frame (e.g., 204 of FIG. 2). In some implementations, the right air spring 352b comprises the at least one right exhaust valve 356b and the at least one right inflate valve 358b. In other implementations, the at least one right exhaust valve 356b and the at least one right inflate valve 358b are physically separate from, but in fluid communication with, the right air spring 352b.

In some implementations, the actuator system 350 can further comprise a center valve 360 that is configured to permit air flow between the left air spring 352a and the right air spring 352b. In this manner, the center valve 360 can facilitate the mutual exchange of air between the air springs 352a, 352b thereby facilitating cooperation between the air springs 352a, 352b to meet a target/set air pressure.

The left and right air springs 352a, 352b are actively controlled by a control device (e.g., 110) through a feedback system. In some implementations, the air pressure in the air springs 352a, 352b can be adjusted as a result of (e.g., in response to) one or more actuator adjustment commands (e.g., a signal setting a target air pressure) provided by the control device 110. The actuator adjustment commands can be generated by the control device 110 in response to one or more of: (1) evaluating the center frame position data and determining the position of the suspended center frame (e.g., 202) needs adjusting; and/or (2) comparing a detected air spring force in the respective one or more air springs 352a, 352b to a preset target force, as set by the control device 110, for the one or more air springs 352a, 352b. A vehicle air supply 362 can supply air to the air springs 352a and 352b of the actuator system 350.

A CFP system 100 incorporating air springs offers several advantages over mechanical springs. First, the air springs are a less expensive solution and are relatively simple to implement. Air springs typically do not require fluid or a fluid reservoir to store fluid because air pressure can be reduced by directly venting to the atmosphere. In contrast, some agricultural sprayers utilizing electro-hydraulic valves and hydraulic actuation to apply force to a suspended center frame are expensive and add extra cost to vehicles because they require extensive control software development, additional sensors for feedback, and fluid storage compartments.

Second, air pressure in the air springs can be dynamically adjusted based on detected conditions to allow optimization of the spring rate for both varying in-field conditions and steady in-field conditions. Variable pressure air springs are capable of quickly adjusting air pressure and, therefore, output force on the suspended center frame of an agricultural sprayer. The ability to more rapidly and accurately adjust the position of the suspended center frame with a variable spring allows the method and system described herein to improve performance of the boom height system over a wider operating band and broader environmental conditions.

Figure 4:
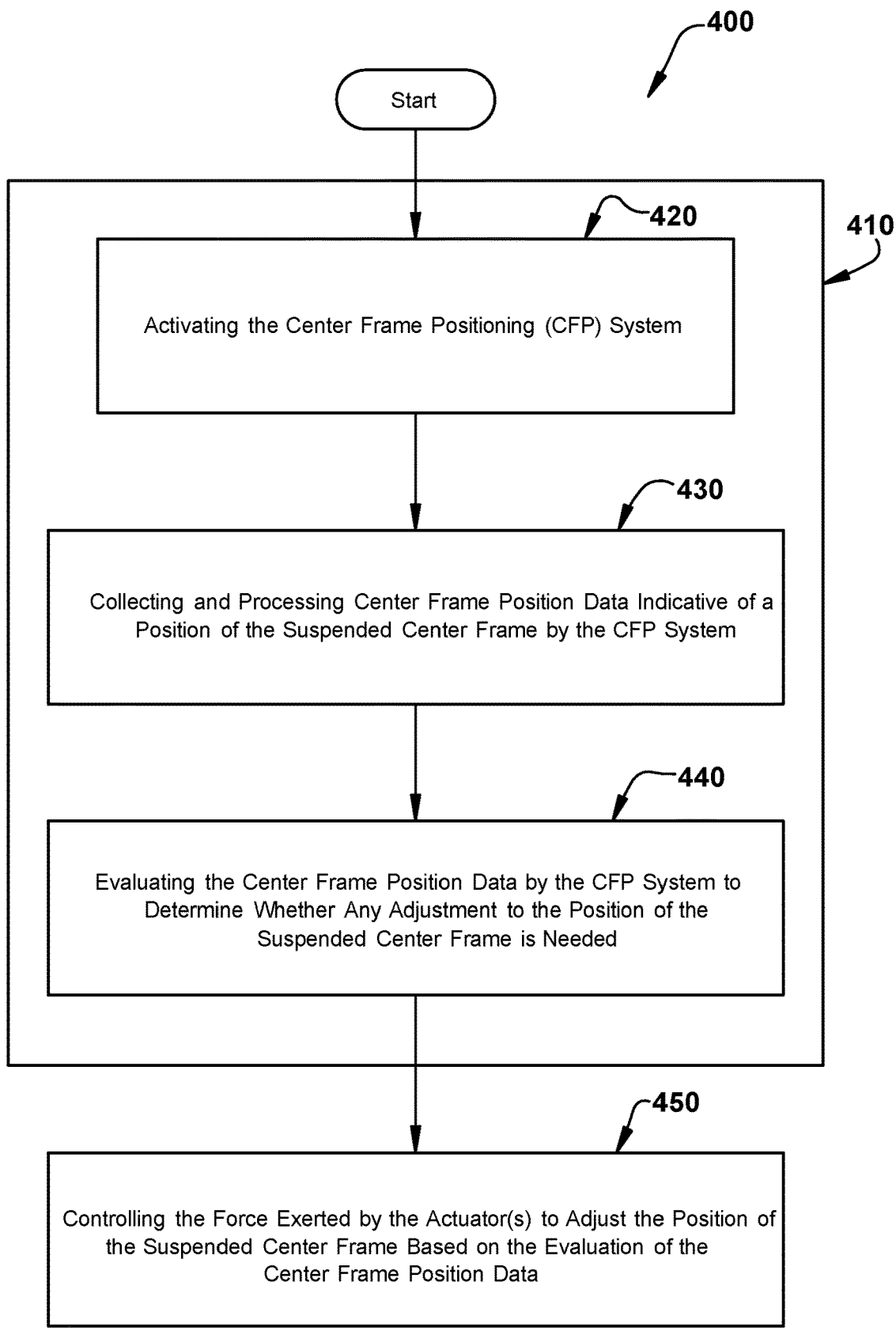
FIG. 4 is a flow diagram illustrating an implementation of an example method for adjusting the position of a suspended center frame of an agricultural sprayer vehicle using a CFP system in accordance with this disclosure.

FIG. 4 is a flow diagram illustrating an implementation of a general method 400 for adjusting the position of a suspended center frame 202 of an agricultural sprayer vehicle using a center frame positioning (CFP) system 100 in accordance with this disclosure. At 410, the method 400 broadly comprises using the CFP system 100 to determine whether any adjustment to the position of the suspended center frame 202 is needed (e.g., repositioned or re-centered) and, at 450, controlling one or more variable pressure actuators (e.g., 252) to operably exert a force on the suspended center frame 202 configured to adjust the position of the suspended center frame 202 of the agricultural sprayer vehicle. Given the suspended center frame 202 is attached to sprayer boom, adjusting the force exerted by the one or more actuators (e.g., 252) on the suspended center frame 202 results in adjustment of a distance of the sprayer boom from the ground.

As shown in FIG. 4, using the CFP system 100 to determine whether any adjustment to the position of the suspended center frame 202 is needed, at 410, comprises a collection of other steps 420, 430, and 440. At 420, the CFP system 100 is activated. Following activation of the CFP system 100, at 430 the CFP system 100 collects and processes center frame position data indicative of a position of a suspended center frame (e.g., 204) in the CFP system 100. In some implementations, a control device (e.g., 110) can be programmed to collect and process center frame position data received from one or more sensors $S_1$-$S_N$. The one or more sensors $S_1$-$S_N$ are configured to continuously monitor center frame position data such as, for example, by taking readings multiple times per second. In some implementations, center frame position data provided by the one or more sensors $S_1$-$S_N$ comprises one or more of: vehicle heading, vehicle turn rate, vehicle speed, vehicle chassis roll, boom roll of the sprayer boom, sprayer boom wing height, output force in a variable pressure actuator (e.g., air pressure in an air spring), and lift actuation provided by one or more actuators (e.g., 152).

In some implementations, processing the center frame position data by the control device 110 can comprise performing calculations such as, for example, calculating a chassis roll moving average of the agricultural sprayer vehicle and a boom roll moving average of the boom coupled with the suspended center frame, to evaluate the center frame position data over a period of time rather than at a specific point in time. In some implementations, the center frame position data can be stored in a memory device 116 of a control device 110 where the center frame position data can be processed by a processor 114, for example by using CFP logic 118, of the control device 110. In some implementations, the center frame position data can be stored and processed in a boom height control system controller. In other implementations, the position data can be stored and processed in a different controller.

At 440, the CFP system 100 evaluates the center frame position data to determine whether any adjustment to the position of the suspended center frame 202 is needed. In some implementations, evaluation of the center frame position data at 440 generally comprises comparing the collected and processed center frame position data of a monitored variable (e.g., vehicle heading) to a corresponding threshold value for that variable (e.g., vehicle heading threshold). In some implementations, the threshold values can be dependent on the particular specifications of the agricultural sprayer vehicle and corresponding sprayer boom such as, for example, the material composition, weight, boom length, etc. As will be explained in more detail below, the relationships between collected and processed center frame position data and any corresponding threshold values can be used to determine whether the position of the suspended center frame 202 needs adjusting (e.g., repositioning or re-centering).

Referring still to FIG. 4, at 450 the CFP system 100 controls the force exerted by the one or more actuators (e.g., 152) to adjust the position of the suspended center frame 202. Step 450 is performed if the evaluation at 440 determines the position of the suspended center frame 202 needs adjustment. As an example, at 450 the CFP system 100 can be employed to resist further movement of the suspended center frame 202 and/or to adjust the position of the suspended center frame 202 (e.g., by moving the position of the suspended center frame 202 such as to reposition and/or re-center the suspended center frame 202).

The one or more actuators (e.g., 152) configured to operably exert a force on the suspended center frame 202 can comprise an air spring, a hydraulic actuator (e.g., hydraulic cylinder), a pneumatic actuators (e.g., pneumatic cylinder), an electric linear actuator, a hydraulic motor, and an electric motor. The CFP system 100 can comprise any number of actuators (e.g., 152) oriented relative to the suspended center frame (e.g., 202). In some implementations, the actuator (e.g., 152) comprises actuators (e.g., 252a, 252b) disposed on first and second sides 204a, 204b of the suspended center frame (e.g., 202), each respective actuator 252a, 252b configured to operably exert variable force (e.g., via air pressure) on the suspended center frame (e.g., 202).

The general method 400 for adjusting the position of a suspended center frame 202 of an agricultural sprayer vehicle using a center frame positioning (CFP) system 100 is applicable to a variety of operating conditions. In some implementations, the method 400 can be applied to provide compensation. As an example, the method 400 can provide headland turn compensation by increasing the pressure in the actuators (e.g., 150) to reduce boom roll movement during a turn to increase overall boom stability. As another example, the method 400 is capable of providing inclined plane (e.g., sidehill) compensation by applying additional force to the suspended center frame 202 while operating the agricultural sprayer vehicle on a sidehill to counteract the natural effect of gravity that causes the boom to hang off-center. As another example, the method 400 is capable of providing boom wing raise compensation by changing the actuator force (e.g., the air pressure in the air springs) to counteract the negative effect of a wing-raise on boom roll. As another example, the method 400 is capable of providing boom mass-moment imbalance compensation, such as by increasing air pressure in the air springs, to offset boom mass-moment imbalances that can cause undesirable boom roll (e.g., when an outer boom section is folded causing a shift in mass-moment and therefore boom roll).

In other implementations, the method 400 can be applied to terrain-based events. As an example, for a high amplitude, low-frequency event (e.g., terrain based event), the method 400 can provide the ability to adjust actuator output force (e.g., air pressure in the air springs) when such an event is sensed in the field to improve boom decoupling and boom settling. As another example, for a low amplitude, high-frequency event (e.g., terrain based event), the method 400 can provide the ability to adjust actuator output force (e.g., air pressure in the air springs) based on sensed events that are consistently seen in the field over time.

The methods disclosed and described in detail herein are designed to supplement the boom height system, not replace the boom height system. The methods can be applied to restrict the freedom of movement of the suspended center frame (e.g., 202) to a limited range in some implementations. In other implementations, the methods can be applied to adjust the position (e.g., re-center or reposition) of the suspended center frame. The methods are configured to maintain the suspended center frame and attached sprayer boom at a desired height above the ground under a variety of different use conditions. Thus, the CFP system and method of this disclosure simplifies the job of the boom height system and improves the overall performance of the boom height system.

Figure 5A:
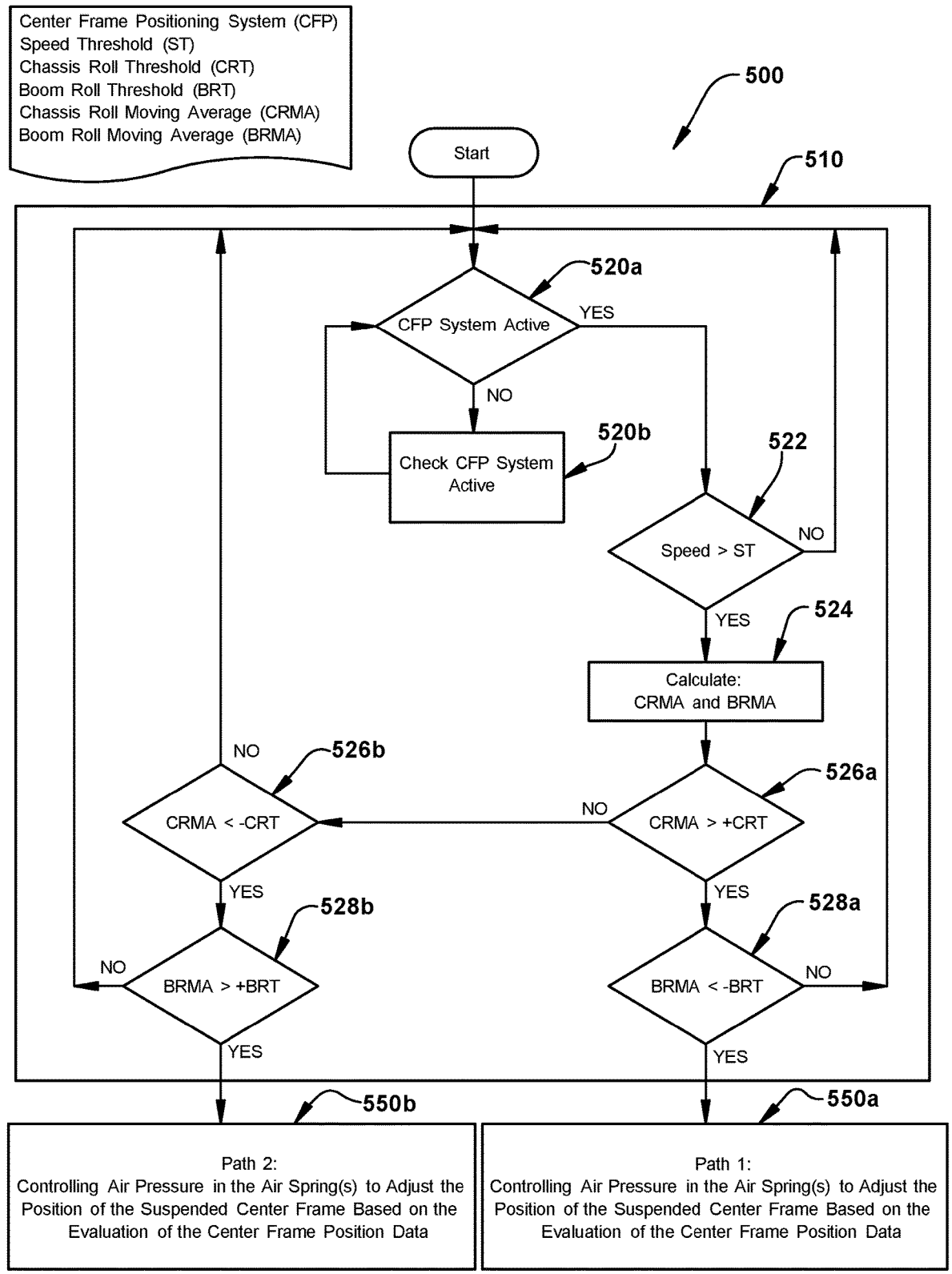
FIGS. 5A, 5B, and 5C are flow diagrams illustrating one implementation of an example method for adjusting the position of a suspended center frame of an agricultural sprayer vehicle using a CFP system in accordance with this disclosure.
Figure 5B:
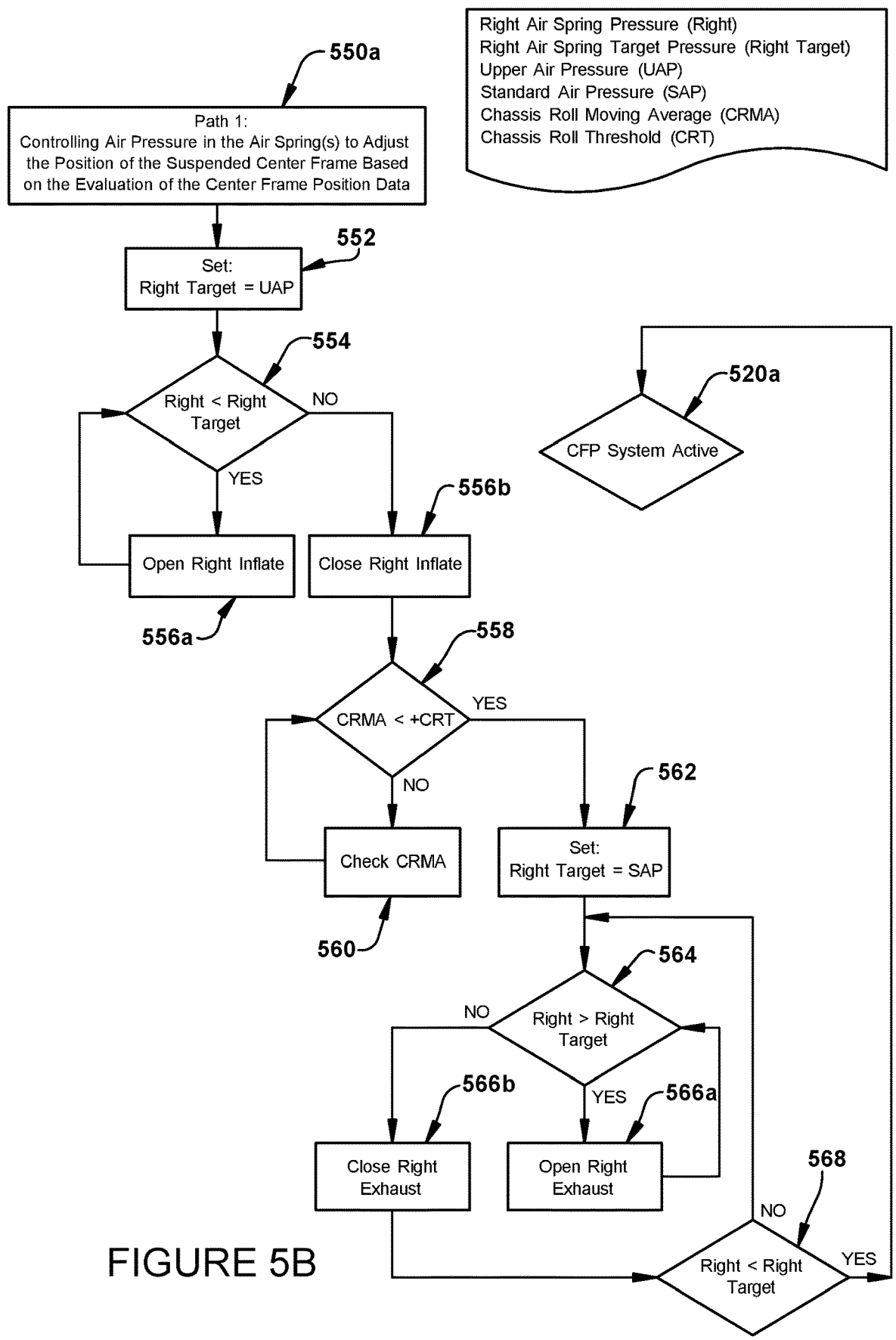
Figure 5C:
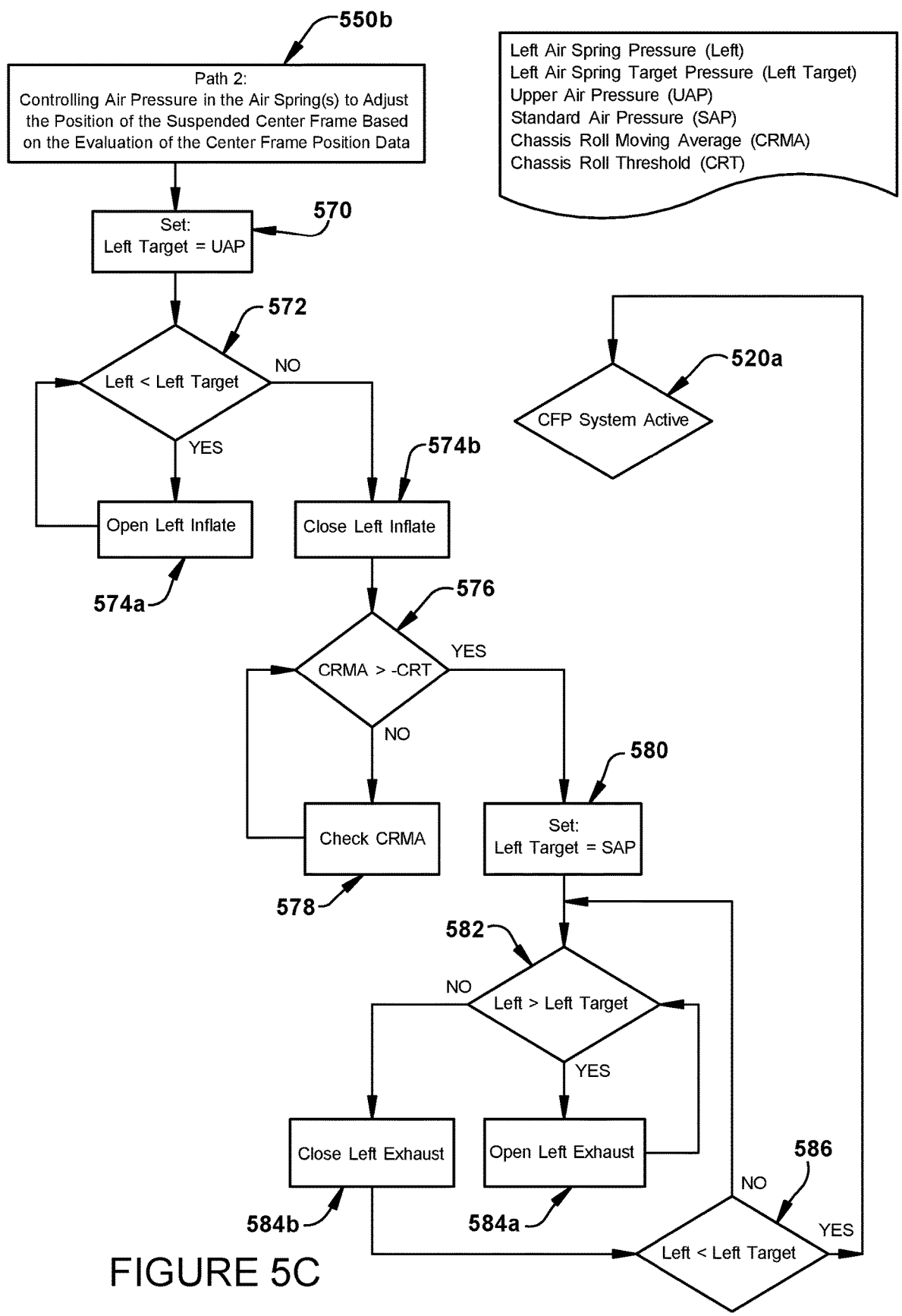
Figure 6A:
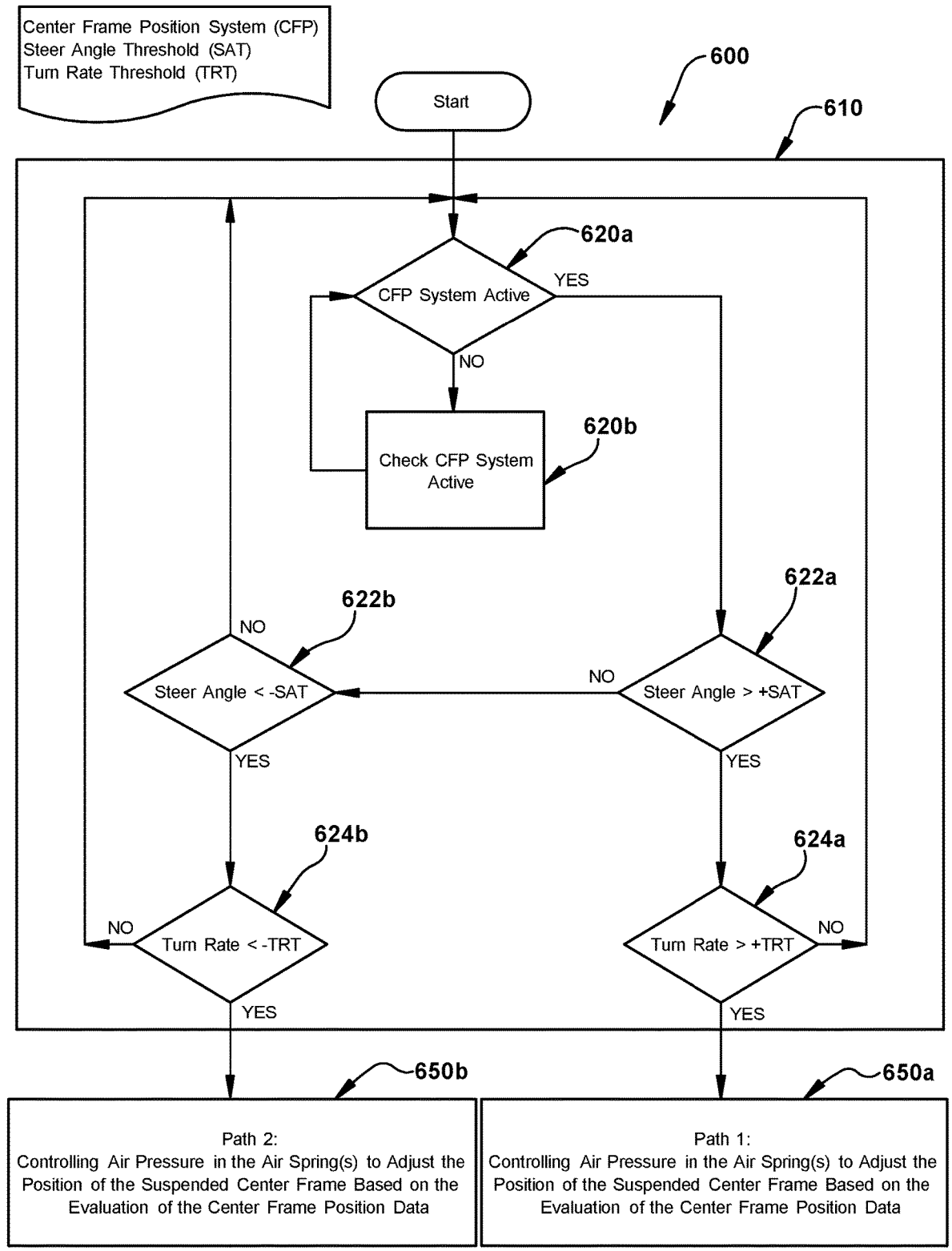
FIGS. 6A, 6B and 6C are flow diagrams illustrating another implementation of an example method for adjusting the position of a suspended center frame of an agricultural sprayer vehicle using a CFP system in accordance with this disclosure.
Figure 6B:
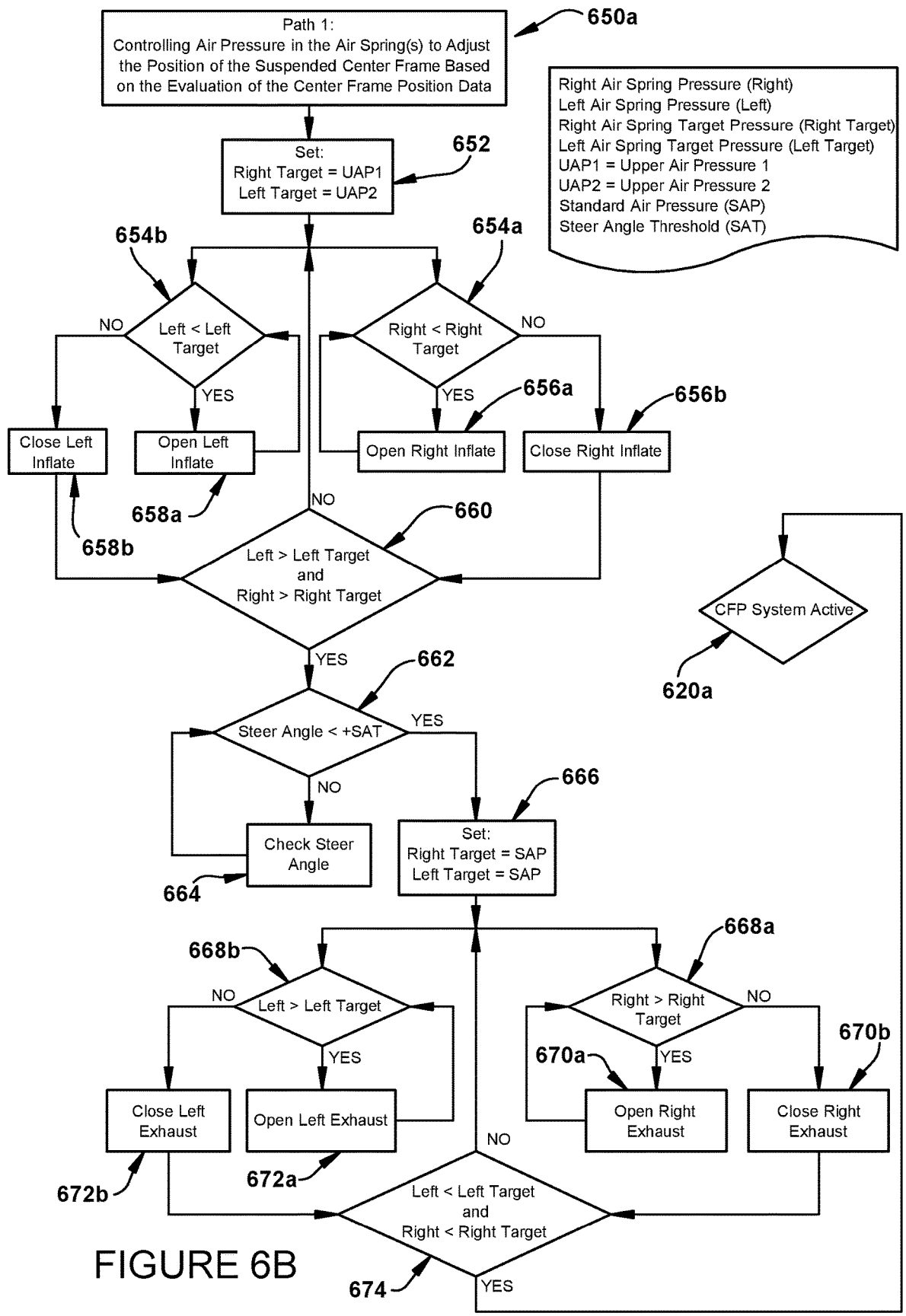
Figure 6C:
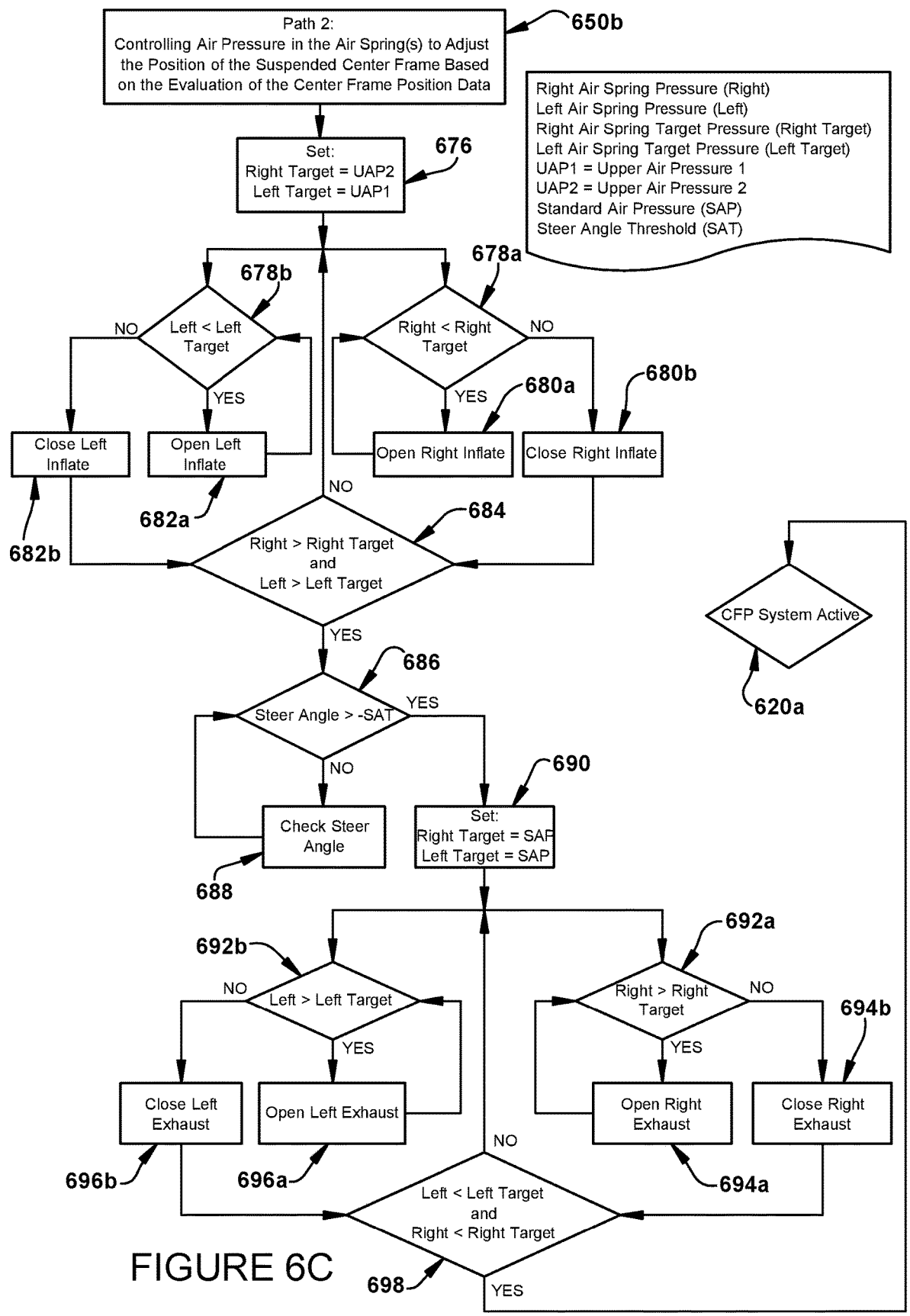

Referring now to FIGS. 5a-5c and 6a-6c, there are flow diagrams illustrating two example implementations 500, 600 of the general method 400 for adjusting the position of a suspended center frame (e.g., 202) of an agricultural sprayer vehicle using a center frame positioning (CFP) system 100. In particular, each example implementation 500, 600 illustrates application of the general method 400 to a type of operating condition or event. FIGS. 5a-5c show implementation of a method 500 to operation of an agricultural sprayer vehicle on an inclined plane, for example, a hillside. FIGS. 6a-6c show implementation of a method 600 to a turning event for an agricultural sprayer vehicle. However, one skilled in the art should recognize that the general method 400 for adjusting the position of a suspended center frame (e.g., 202) of an agricultural sprayer vehicle using a center frame positioning (CFP) system 100 is not limited to any particular application or use and can be adapted to suit a variety of settings.

Referring now to FIGS. 5a-5c, there are flow diagrams illustrating an example implementation of a method 500 for adjusting the position of a suspended center frame (e.g., 202) of an agricultural sprayer vehicle using a center frame positioning (CFP) system 100, applied to operation of an agricultural sprayer vehicle on an inclined plane (e.g., a hillside). The boom height system of an agricultural sprayer vehicle is very sensitive to operation on an inclined plane, such as a hillside, because the agricultural sprayer vehicle tends to lean to one side causing the sprayer boom to roll from level with the agricultural sprayer vehicle. An agricultural sprayer vehicle operating on a hillside would benefit from having the disclosed CFP system 100 implementing the method 500 described below to reposition (e.g., adjust or level) the suspended center frame and attached sprayer boom with respect to the agricultural sprayer vehicle and ground (e.g., 502 in FIGS. 5d-5f).

FIG. 5A is a flow diagram illustrating an example implementation of a method 500 directed to operation on an inclined plane (e.g., hillside), the method 500 comprising two broad steps 510 and 550 (550 collectively refers to 550a and 550b). At 510, is determining, using the CFP system (e.g., 100), whether any adjustment to the position of the suspended center frame (e.g., 202) is needed such as, for example, to reposition or re-center. At 550, are two different paths 550a, 550b for controlling one or more variable pressure actuators using the CFP system (e.g., 100), each variable pressure actuator configured to operably exert a force on the suspended center frame (e.g., 202) of the agricultural sprayer vehicle.

In this implementation, the actuators comprise air springs (e.g., 352a, 352b). The air pressure in the air springs (e.g., 352a, 352b) can be controlled by the CFP system (e.g., 100) and, in particular, a control device (e.g., 110) providing one or more actuator adjustment commands to the air springs (e.g., 352a, 352b). It should be appreciated that step 510 can dictate which method path 550a and 550b is used to adjust the position of the suspended center frame (e.g., 202) of the agricultural sprayer vehicle. Given the suspended center frame is attached to sprayer boom (e.g., 502), adjusting the force exerted by the one or more actuators (e.g., 352a, 352b) on the suspended center frame (e.g., 202) results in adjustment of a distance d of the sprayer boom from the ground 513.

FIG. 5A illustrates a collection of steps broadly encompassing activating the CFP system (e.g., 100), collecting and processing center frame position data indicative of a position of the suspended center frame (e.g., 202) by the CFP system (e.g., 100), and evaluating the center frame position data by the CFP system (e.g., 100) to determine whether any adjustment to the position of the suspended center frame (e.g., 202) is needed. At 520a, is determining whether the CFP system 100 is active. At 520b, is continuously performing a check to determine whether the CFP system 100 is active. Once the CFP system is activated, the CFP system (e.g., 100) coordinates the collecting and processing of center frame position data indicative of a position of the suspended center frame (e.g., 202). In some implementations, one or more sensors $S_1$-$S_N$ are configured to monitor center frame position data and to generate a signal representative of the monitored center frame position. In this implementation, some relevant center frame position data to monitor, collect, and process comprise vehicle speed, vehicle chassis roll, boom roll of the sprayer boom, and air pressure in the air springs (e.g., 352a, 352b). As an example, the vehicle chassis roll data and boom roll data can be particularly useful indicators the agricultural sprayer vehicle is operating on an incline (e.g., hillside) with a sprayer boom that is out of synchronization with the agricultural sprayer vehicle.

In this implementation, the method 500 further comprises a series of steps in which center frame position data is evaluated to determine whether any adjustment to the position of the suspended center frame (e.g., 202) is needed. At 522, a control device (e.g., 110) compares the agricultural sprayer vehicle speed to a predetermined vehicle speed threshold. In this implementation, if the control device (e.g., 110) determines the agricultural sprayer vehicle speed is greater than the predetermined vehicle speed threshold, the method 500 proceeds to a center frame position data calculation step at 524. If the agricultural sprayer vehicle speed is not greater than the predetermined vehicle speed threshold, the method 500 starts over.

As previously mentioned, threshold values can depend on the agricultural sprayer vehicle specifications. As an example, for a John Deere R4038 with 120 feet steel booms, the agricultural sprayer vehicle speed threshold is approximately 6 mph. As an example, implementing the method 500 shown in FIG. 5A on a John Deere R4038 results in comparing an agricultural sprayer vehicle speed to a vehicle speed threshold of approximately 6 mph.

At 524, the control device (e.g., 110) calculates vehicle chassis roll moving average (CRMA) and boom roll moving average (BRMA). As an example, the CRMA and BRMA are calculated and utilized in the method 500 because the moving averages reflect a value over time rather than at a specific point. In some implementations, chassis roll data is supplied by an inertial measurement unit (IMU) which can also provide the chassis roll rate and pitch. In some implementations, boom roll data is supplied by a linear variable differential transformer (LVDT), or any other type of position sensor, which measures rotation displacement of the boom (e.g., boom roll).

The method 500 proceeds to a series of evaluation steps at 526a, 526b and 528a, 528b. At 526a, the control device (e.g., 110) compares CRMA to a predetermined vehicle chassis roll threshold such as, for example, a positive chassis roll threshold (+CRT). In this implementation, if the control device (e.g., 110) determines the CRMA is greater than +CRT, then the method 500 proceeds to step 528a. At 528a, the control device (e.g., 110) compares BRMA to a predetermined boom roll threshold such as, for example, a negative boom roll threshold (−BRT). In this implementation, if the control device (e.g., 110) determines BRMA is less than −BRT, then the method 500 proceeds to step 550a. As an example, BRMA<−BRT tends to result in an elevated boom wing height at the tips of the sprayer boom. In the event BRMA is not less than −BRT, the method 500 starts over.

Figure 5D:
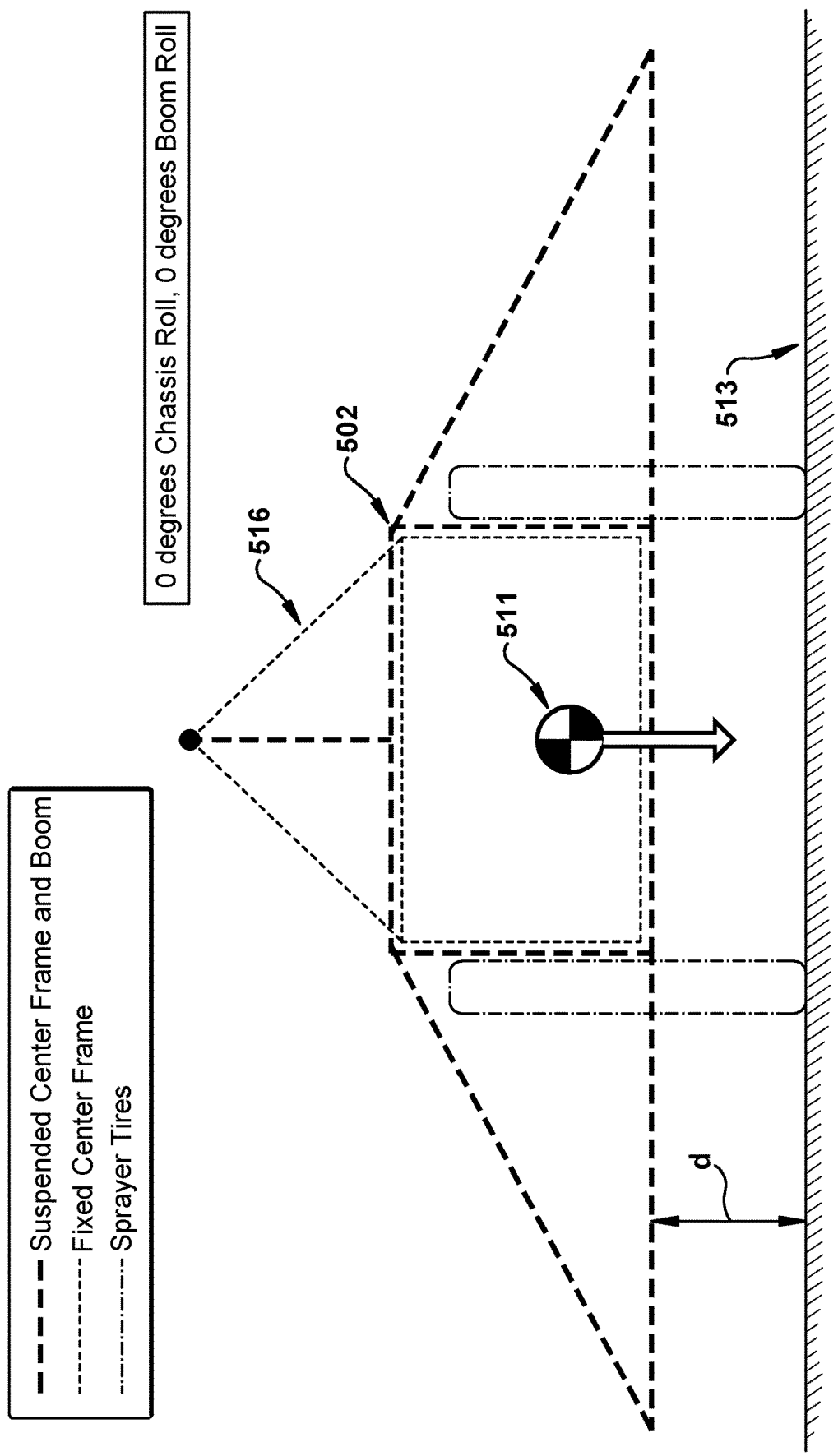
FIGS. 5D, 5E, and 5F are component representations of example conditions described in the flow diagrams of FIGS. 5A and 5B.
Figure 5E:
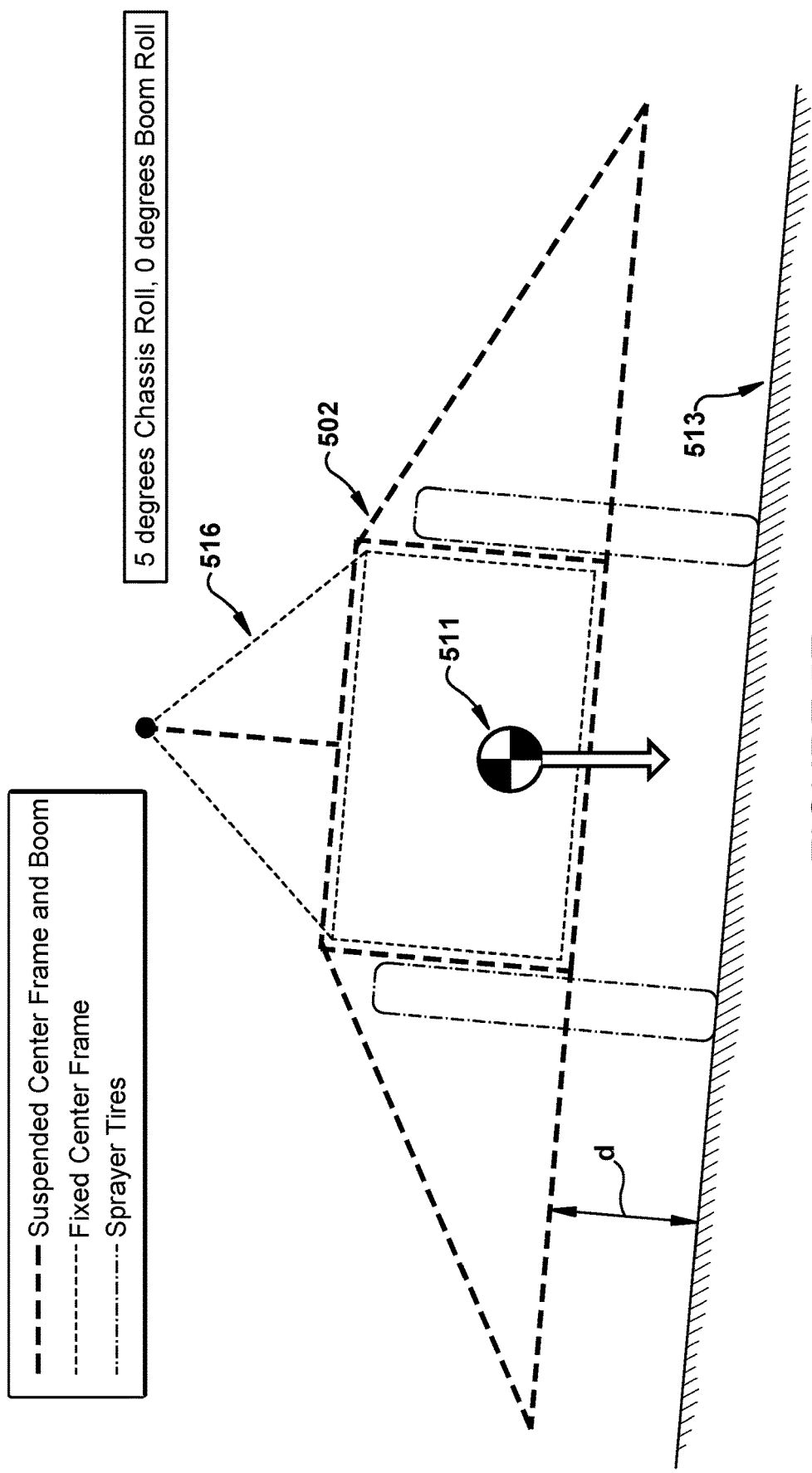

FIGS. 5D and 5E each illustrate a scenario in which the method 500 starts over. In the implementation in FIG. 5D, the fixed center frame 516 and the suspended center frame 502 are aligned and synchronized with the vehicle. In this implementation, chassis roll is 0° and boom roll is 0° and adjustment of the suspended center frame 502 is not needed. In the implementation in FIG. 5E, the BRMA is not less than −BRT. In this implementation, the chassis roll is 5° but boom roll is 0° and adjustment of the suspended center frame 502 is not needed.

It should be noted that both +CRT and −BRT depend on the agricultural sprayer vehicle specifications. For a John Deere R4038 with 120 feet steel booms, the +CRT is approximately 2° and the −BRT is approximately −1°. As an example, implementing the method 500 shown in FIG. 5A on a John Deere R4038 results in the CRMA being compared to a +CRT of 2° and the BRMA being compared to a −BRT of −1°.

Figure 5F:
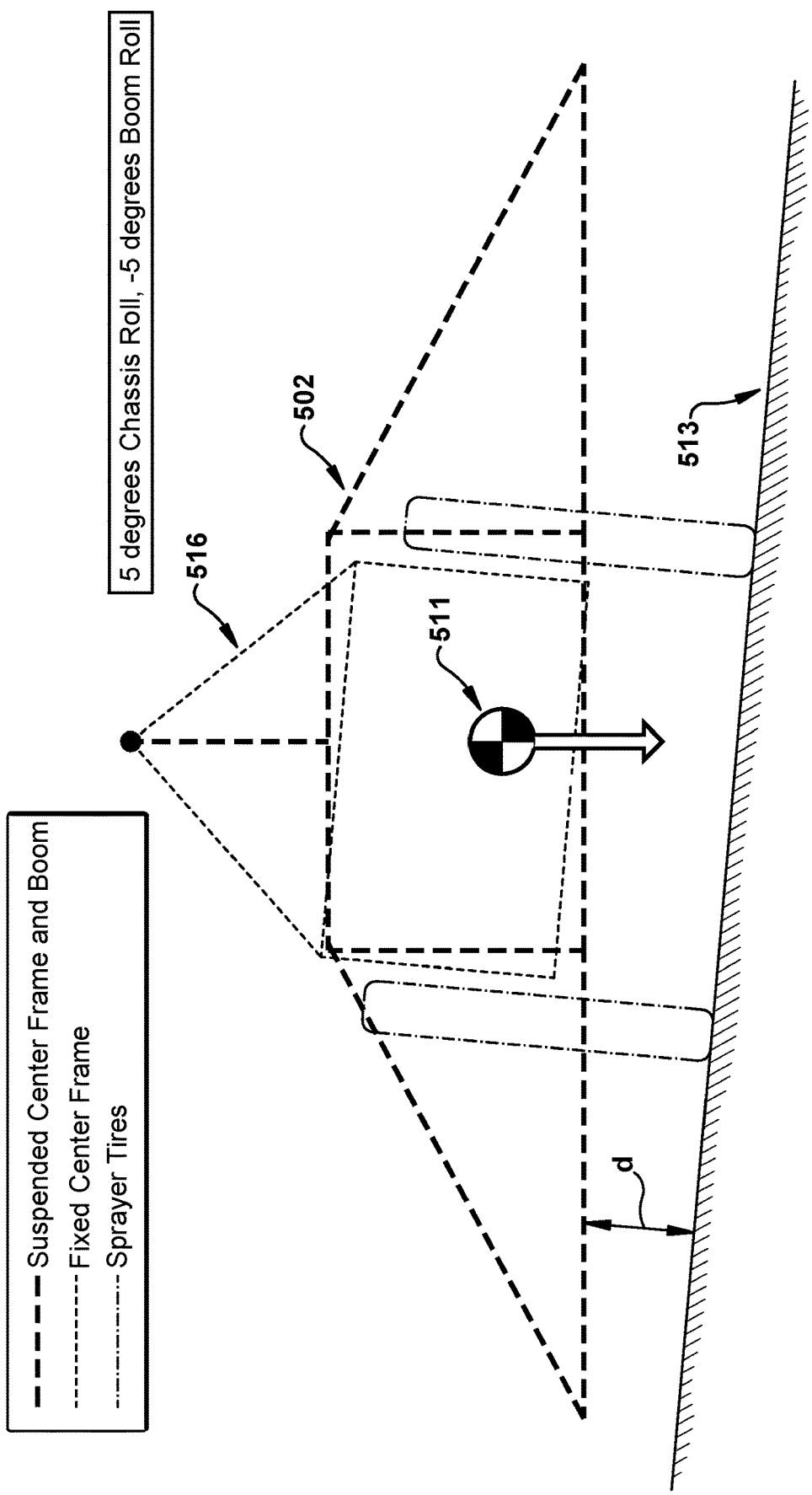

FIG. 5A shows a flow diagram having evaluation steps 526a and 528a that are connected in series because, when operating an agricultural sprayer vehicle on an inclined plane (e.g., hillside), a positive chassis roll induces negative boom roll due to the force of gravity and the location of the center of gravity 511 on the sprayer booms. As an example, FIG. 5F illustrates a scenario in which positive chassis roll of 5° induces negative boom roll of −5° due to the force of gravity and the location of the center of gravity 511. In FIG. 5F, the fixed center frame 516 and the suspended center frame 502 are not aligned and are out of synchronization. The positive chassis roll coupled with negative boom roll results in a right boom wing height above a target height and a left boom wing height below a target height.

In this implementation, the method 500 proceeds to evaluation step 526b if CRMA is not greater than +CRT at step 526a. At 526b, the control device (e.g., 110) compares CRMA to a predetermined vehicle chassis roll threshold such as, for example, a negative chassis roll threshold (−CRT). In this implementation, if the control device (e.g., 110) determines CRMA is less than −CRT, then the method 500 proceeds to step 528b. At 528b, the control device (e.g., 110) compares BRMA to a predetermined boom roll threshold such as, for example, a positive boom roll threshold (+BRT). In this implementation, if the control device (e.g., 110) determines BRMA is greater than +BRT, then the method 500 proceeds to step 550b. As an example, a BRMA>+BRT tends to result in an elevated boom wing height at the tips of the boom. In the event BRMA is not greater than +BRT, the method 200 starts over.

It should be noted that both −CRT and +BRT depend on the agricultural sprayer vehicle specifications. For a John Deere R4038 with 120 feet steel booms, the −CRT is approximately −2° and the +BRT is approximately 1°. As an example, implementing the method 500 shown in FIG. 5A on a John Deere R4038 results in the CRMA being compared to a −CRT of −2° and the BRMA being compared to a +BRT of 1°.

In the flow diagram shown in FIG. 5A, evaluation steps 526b and 528b are connected in series because, when operating an agricultural sprayer on an inclined plane, a negative chassis roll induces positive boom roll due to the force of gravity and the location of the center of gravity on the sprayer booms. Negative chassis roll coupled with positive boom roll results in a right boom wing height below a target height and a left boom wing height above a target height.

In this implementation, method steps 550a and 550b represent two paths which perform the same general function—controlling air pressure in one or more air springs (e.g., 352a, 352b), to adjust the position of the center frame (e.g., 202) of the agricultural sprayer vehicle. But, steps 550a and 550b define different paths because each addresses a different magnitude of chassis roll and boom roll.

Referring now to FIGS. 5B and 5C, there are flow diagrams indicating two paths 550a and 550b for controlling air pressure in one or more air springs (e.g., 352a, 352b) to adjust the position of the suspended center frame (e.g., 202) in the agricultural sprayer vehicle based on the evaluation of center frame position data. In some implementations of method 500, the CFP system (e.g., 100, 350) further comprises air spring pressure sensors, or air spring force detecting sensors (e.g., 354a, 354b), which may be positioned adjacent the air springs (e.g., 352a, 352b). As an example, the air spring force detecting sensors (e.g., 354a, 354b) can be pressure taps configured to measure air flow. The air spring force detecting sensors (e.g., 354a, 354b) monitor air pressure and generate a signal representative of the current air pressure in each respective air spring (e.g., 352a, 352b).

FIG. 5B is a flow diagram illustrating an example implementation of a method 550a for adjusting the position of a suspended center frame (e.g., 202) of an agricultural sprayer vehicle using a CFP system (e.g., 100), applied to operation of an agricultural sprayer vehicle on an inclined plane (e.g., a hillside) when positive chassis roll induces negative boom roll. At 552, the control device (e.g., 110) sets a target pressure, or target force, for the right air spring (right target) (e.g., 352b) to an upper air pressure (UAP). The value of the UAP can vary depending on data taken in the field as well as the agricultural sprayer vehicle specifications. As an example, the control device (e.g., 110) can set the target pressure to a value reflecting the force necessary for an air spring (e.g., 352a, 352b) to move the suspended center frame (e.g., 202). For a John Deere R4038 with 120 feet steel booms, the UAP can be set at approximately 60 psi. Once the right air spring target pressure (right target) is set to UAP at 552, an evaluation step 554 occurs.

At 554, the control device (e.g., 110) compares a detected air spring force such as, for example, the right air spring pressure (right) (e.g., 352b) to a preset target force for the right air spring (e.g., 352b) such as, for example, the right air spring target pressure (previously set to UAP). As an example, the result of the comparison by the control device (e.g., 110) determines whether a right air spring inflate valve (e.g., 358b) is opened or closed. In this implementation, if the right air spring pressure (right) (e.g., 352b) is less than the right air spring target pressure (right target), the method 500 proceeds to step 556a in which the right air spring inflate valve (e.g., 358b) is opened. In some implementations, the right air spring inflate valve (e.g., 358b) opens in response to receiving an actuator adjustment command from the control device (e.g., 110). After opening the right air spring inflate valve (e.g., 358b) at 556a, the method 500 loops back to evaluation step 554, wherein the control device (e.g., 110) compares the right air spring pressure (right) (e.g., 352*b*) to the right air spring target pressure (right target). As long as the right air spring pressure (right) (e.g., 352*b*) continues to be less than the right air spring target air pressure (right target) in the evaluation step at 554, the step 556*a* of opening the right air spring inflate valve (e.g., 358*b*) continues to be performed.

In this implementation, if the right air spring pressure (right) (e.g., 352*b*) is not less than the right air spring target pressure (right target), the method 500 proceeds to step 556*b* in which the right air spring inflate valve (e.g., 358*b*) is closed. In some implementations, the right air spring inflate valve (e.g., 358*b*) closes in response to receiving an actuator adjustment command from the control device (e.g., 110). After closing the right air spring inflate valve (e.g., 358*b*), the method 500 proceeds to step 558. At 558, the control device (e.g., 110) compares CRMA to a predetermined vehicle chassis roll threshold such as, for example, a positive chassis roll threshold (+CRT). In this implementation, if the control device (e.g., 110) determines the CRMA is not less than the +CRT, a step 560 of checking the CRMA occurs. The evaluation step at 558 and the checking step at 560 may form a loop that is not broken until the CRMA is less than the +CRT.

Once the control device (e.g., 110) determines the CRMA is less than the +CRT, the method 500 proceeds to step 562. At 562, the control device (e.g., 110) sets a target pressure, or target force, for the right air spring (right target) to a standard air pressure (SAP). The value of the SAP can vary depending on data taken in the field as well as the agricultural sprayer vehicle specifications. As an example, the control device (e.g., 110) can set the target pressure to a value reflecting the force necessary for an air spring (e.g., 352*a*, 352*b*) to move the suspended center frame (e.g., 202). For a John Deere R4038 with 120 feet steel booms, the SAP can be set at approximately 20 psi. Once the right air spring target pressure (right target) is set to SAP at 562, an evaluation step 564 occurs.

At 564, the control device (e.g., 110) compares a detected air spring force such as, for example, the right air spring pressure (right) (e.g., 352*b*) to a preset target force for the right air spring (e.g., 352*b*) such as, for example, the right air spring target pressure (previously set to SAP). As an example, the result of the comparison by the control device (e.g., 110) determines whether a right air spring exhaust valve (e.g., 356*b*) is opened or closed. In this implementation, if the right air spring pressure (right) (e.g., 352*b*) is greater than the right air spring target pressure (right target), the method 500 proceeds to step 566*a* in which the right air spring exhaust valve (e.g., 356*b*) is opened. In some implementations, the right air spring exhaust valve (e.g., 356*b*) opens in response to receiving an actuator adjustment command from the control device (e.g., 110). After opening the right air spring exhaust valve (e.g., 356*b*) at 566*a*, the method 500 loops back to evaluation step 564, wherein the control device (e.g., 110) compares the right air spring pressure (right) (e.g., 352*b*) to the right air spring target pressure (right target). As long as the right air spring pressure (right) (e.g., 352*b*) continues to be greater than the right air spring target pressure (right target) in the evaluation step 564, the step 566*a* of opening the right air spring exhaust valve (e.g., 356*b*) continues to be performed.

In this implementation, if the right air spring pressure (right) (e.g., 352*b*) is not greater than the right air spring target pressure (right target), the method 500 proceeds to step 566*b* in which the right air spring exhaust valve (e.g., 356*b*) is closed. In some implementations, the right air spring exhaust valve (e.g., 356*b*) closes in response to receiving an actuator adjustment command from the control device (e.g., 110). After closing the right air spring exhaust valve (e.g., 356*b*), the method 500 proceeds to step 568. At 568, the control device (e.g., 110) compares the right air spring pressure (e.g., 352*b*) to the right air spring target pressure. In this implementation, if the right air spring pressure (e.g., 352*b*) is not less than the right air spring target pressure, the method 500 returns to evaluation step at 564. The evaluation step at 564 and the exhaust steps 566*a*, 566*b* may form a loop that is not broken until the right air spring pressure (e.g., 352*b*) is less than the right air spring target pressure. Once the right air spring pressure (e.g., 352*b*) is less than the right air spring target pressure, the suspended center frame and attached sprayer boom has been repositioned and the method 500 starts over.

FIG. 5C is a flow diagram illustrating an example implementation of a method 550*b* for adjusting the position of a suspended center frame (e.g., 202) of an agricultural sprayer vehicle using a CFP system (e.g., 100), applied to operation of an agricultural sprayer vehicle on an inclined plane (e.g., a hillside) when negative chassis roll induces positive boom roll. At 570, the control device (e.g., 110) sets a target pressure, or target force, for the left air spring (left target) (e.g., 352*a*) to an upper air pressure (UAP). The value of the UAP can vary depending on data taken in the field as well as the agricultural sprayer vehicle specifications. As an example, the control device (e.g., 110) can set the target pressure to a value reflecting the force necessary for an air spring (e.g., 352*a*, 352*b*) to move the suspended center frame (e.g., 202). For a John Deere R4038 with 120 feet steel booms, the UAP can be set at approximately 60 psi. Once the left air spring target pressure (left target) is set to UAP 570, an evaluation step 572 occurs.

At 572, the control device (e.g., 110) compares a detected air spring force such as, for example, the left air spring pressure (left) (e.g., 352*a*) to a preset target force for the left air spring (e.g., 352*a*) such as, for example, the left air spring target pressure (previously set to UAP). As an example, the result of the comparison by the control device (e.g., 110) determines whether a left air spring inflate valve (e.g., 358*a*) is opened or closed. In this implementation, if the left air spring pressure (left) (e.g., 352*a*) is less than the left air spring target pressure (left target), the method 500 proceeds to step 574*a* in which the left air spring inflate valve (e.g., 358*a*) is opened. In some implementations, the left air spring inflate valve (e.g., 358*a*) opens in response to receiving an actuator adjustment command from the control device (e.g., 110). After opening the left air spring inflate valve (e.g., 358*a*) at 574*a*, the method 500 loops back to evaluation step 572, wherein the control device (e.g., 110) compares the left air spring pressure (left) (e.g., 352*a*) to the left air spring target pressure (left target). As long as the left air spring pressure (left) (e.g., 352*a*) continues to be less than the left air spring target pressure (left target) in the evaluation step at 572, the step 574*a* of opening the left air spring inflate valve (e.g., 358*a*) continues to be performed.

In this implementation, if the left air spring pressure (left) (e.g., 352*a*) is not less than the left air spring target pressure (left target), the method 500 proceeds to step 574*b* in which the left air spring inflate valve (e.g., 358*a*) is closed. In some implementations, the left air spring inflate valve (e.g., 358*a*) closes in response to receiving an actuator adjustment command from the control device (e.g., 110). After closing the left air spring inflate valve (e.g., 358*a*), the method 500 proceeds to step 576. At 576, the control device (e.g., 110) compares CRMA to a predetermined vehicle chassis roll threshold such as, for example, a negative chassis roll threshold (−CRT). In this implementation, if the control device (e.g., 110) determines the CRMA is not greater than the −CRT, a step 578 of checking the CRMA occurs. The evaluation step at 576 and the checking step at 578 may form a loop that is not broken until the CRMA is greater than the −CRT.

Once the control device (e.g., 110) determines the CRMA is greater than the −CRT, the method 500 proceeds to step 580. At 580, the control device (e.g., 110) sets a target pressure, or target force, for the left air spring target pressure (left target) to a standard air pressure (SAP). The value of the SAP can vary depending on data taken in the field as well as the agricultural sprayer vehicle specifications. As an example, the control device (e.g., 110) can set the target pressure to a value reflecting the force necessary for an air spring (e.g., 352a, 352b) to move the suspended center frame (e.g., 202). For a John Deere R4038 with 120 feet steel booms, the SAP can be set at approximately 20 psi. Once the left air spring target pressure (left target) is set to SAP at 580, an evaluation step 582 occurs.

At 582, the control device (e.g., 110) compares a detected air spring force such as, for example, the left air spring pressure (left) (e.g., 352a) to a preset target force for the left air spring (e.g., 352a) such as, for example, the left air spring target pressure (previously set to SAP). As an example, the result of the comparison by the control device (e.g., 110) determines whether a left air spring exhaust valve (e.g., 356a) is opened or closed. In this implementation, if the left air spring pressure (left) (e.g., 352a) is greater than the left air spring target pressure (left target), the method 500 proceeds to step 584a in which the left air spring exhaust valve (e.g., 356a) is opened. In some implementations, the left air spring exhaust valve (e.g., 356a) opens in response to receiving an actuator adjustment command from the control device (e.g., 110). After opening the left air spring exhaust valve (e.g., 356a) at 584a, the method 500 loops back to evaluation step 582, wherein the control device (e.g., 110) compares the left air spring pressure (left) (e.g., 352a) to the left air spring target pressure (left target). As long as the left air spring pressure (left) (e.g., 352a) continues to be greater than the left air spring target pressure (left target) in the evaluation step at 582, the step 584a of opening the left air spring exhaust valve (e.g., 356a) continues to be performed.

In this implementation, if the left air spring pressure (left) (e.g., 352a) is not greater than the left air spring target pressure (left target), the method 500 proceeds to step 584b in which the left air spring exhaust valve (e.g., 356a) is closed. In some implementations, the left air spring exhaust valve (e.g., 356a) closes in response to receiving an actuator adjustment command from the control device (e.g., 110). After closing the left air spring exhaust valve (e.g., 356a), the method 500 proceeds to step 586. At 586, the control device (e.g., 110) compares the left air spring pressure (e.g., 352a) to the left air spring target pressure. In this implementation, if the left air spring pressure (e.g., 352a) is not less than the left air spring target pressure, the method 500 returns to evaluation step at 582. The evaluation step at 582 and the exhaust steps 584a, 584b may form a loop that is not broken until the left air spring pressure (e.g., 352a) is less than the left air spring target pressure. Once the pressure in the left air spring (e.g., 352a) is less than the left air spring target pressure, the suspended center frame and attached sprayer boom has been repositioned and the method 500 starts over.

Referring now to FIGS. 6A-6A, there are flow diagrams illustrating an example implementation of a method 600 for adjusting the position of a suspended center frame (e.g., 202) of an agricultural sprayer vehicle using a center frame positioning (CFP) system 100, during a headland turn event. During a headland turn, the suspended center frame (e.g., 202) rolls a lot because the boom height system of an agricultural sprayer vehicle is very sensitive to side accelerations, such as a turn. An agricultural sprayer vehicle would benefit from having the disclosed CFP system 100 implementing the method 600 described below to keep the suspended center frame (e.g., 202) and attached sprayer boom level as the vehicle accelerates through a headland turn by adjusting the pressure in the air springs (e.g., 352a, 352b).

FIG. 6A is a flow diagram illustrating an example implementation of a method 600 directed to a headland turn event, the method 600 comprising two broad steps 610 and 650 (650 collectively refers to 650a and 650b). At 610, is determining, using the CFP system (e.g., 100), whether any adjustment to the position of the suspended center frame (e.g., 202) is needed such as, for example, to reposition or re-center the suspended center frame (e.g., 202). At 650, are two different paths 650a, 650b for controlling one or more variable pressure actuators using the CFP system (e.g., 100), each variable pressure actuator configured to operably exert a force on the suspended center frame (e.g., 202) of the agricultural sprayer vehicle.

In this implementation, the actuators comprise air springs (e.g., 352a, 352b). The air pressure in the air springs (e.g., 352a, 352b) can be controlled by the CFP system (e.g., 100) and, in particular, a control device (e.g., 110) providing one or more actuator adjustment commands to the air springs (e.g., 352a, 352b). It should be appreciated that step 610 can dictate which method path 650a and 650b is used to adjust the position of the suspended center frame (e.g., 202) of the agricultural sprayer vehicle. Given the suspended center frame is attached to sprayer boom (e.g., 502), adjusting the force exerted by the one or more actuators (e.g., 352a, 352b) on the suspended center frame (e.g., 202) results in adjustment of a distance d of the sprayer boom from the ground 513.

FIG. 6A illustrates a collection of steps broadly encompassing activating the CFP system (e.g., 100), collecting and processing center frame position data indicative of a position of the suspended center frame (e.g., 202) by the CFP system (e.g., 100), and evaluating the center frame position data by the CFP system (e.g., 100) to determine whether any adjustment to the position of the suspended center frame (e.g., 202) is needed. At 620a, is determining whether the CFP system 100 is active. At 620b, is continuously performing a check to determine whether the CFP system 100 is active. Once the CFP system is activated, the CFP system (e.g., 100) coordinates the collecting and processing of center frame position data indicative of a position of the suspended center frame (e.g., 202). In some implementations, one or more sensors $S_1$-$S_N$ are configured to monitor center frame position data and to generate a signal representative of the monitored center frame position. In this implementation, some relevant center frame position data to monitor, collect, and process involve variables such as vehicle heading (e.g., steer angle, GPS data, etc.), vehicle turn rate, and air pressure in the air springs (e.g., 352a, 352b). As an example, the vehicle turn rate data can indicate the magnitude of acceleration when turning (e.g., performing a headland turn). In some implementations, the vehicle heading data can come from a bus (e.g., 124) or from communication with the agricultural sprayer vehicle (e.g., such as via the communication interface 126).

In this implementation, the method 600 further comprises a series of steps in which center frame position data is evaluated to determine whether any adjustment to the position of the suspended center frame (e.g., 202) is needed. At 622a, a control device (e.g., 110) compares the agricultural sprayer vehicle heading to a predetermined vehicle heading threshold such as, for example, a positive vehicle heading threshold (+SAT). In this implementation, if the control device (e.g., 110) determines the agricultural sprayer vehicle heading is greater than +SAT, then the method 600 proceeds to step 624a. At 624a, the control device (e.g., 110) compares vehicle turn rate to a predetermined vehicle turn rate threshold such as, for example, a positive vehicle turn rate threshold (+TRT). In this implementation, if the control device (e.g., 110) determines the vehicle turn rate is greater than +TRT, then the method 600 proceeds to step 650a. In the event vehicle turn rate is not greater than +TRT, the method 600 starts over.

It should be noted that both +SAT and +TRT depend on the agricultural sprayer vehicle specifications. For a John Deere model R4038 with 120 feet steel booms, the +SAT is approximately 5° and the +TRT is approximately 10°/sec. As an example, implementing the method 600 shown in FIG. 6A on a John Deere R4038 results in the vehicle heading being compared to a +SAT of 5° and the vehicle turn rate being compared to a +TRT of 10°/sec.

FIG. 6A shows a flow diagram having evaluation steps 622a and 624a that are connected in series because, when operating an agricultural sprayer vehicle during a headland turn, a positive vehicle heading and a positive vehicle turn rate indicate a right-handed turn. As an example, a right-handed turn can cause lateral boom acceleration resulting in positive boom roll.

In this implementation, the method 600 proceeds to evaluation step 622b if vehicle heading is not greater than +SAT at step 622a. At 622b, the control device (e.g., 110) compares vehicle heading to a predetermined vehicle heading threshold such as, for example, a negative vehicle heading threshold (−SAT). In this implementation, if the control device (e.g., 110) determines the vehicle heading is less than −SAT, then the method 600 proceeds to step 624b. At 624b, the control device (e.g., 110) compares vehicle turn rate to a predetermined vehicle turn rate threshold such as, for example, a negative turn rate threshold (−TRT). In this implementation, if the control device (e.g., 110) determines the vehicle turn rate is less than −TRT, then the method 600 proceeds to step 650b. In the event vehicle turn rate is not less than −TRT, the method 600 starts over.

It should be noted that both −SAT and −TRT depend on the agricultural sprayer vehicle specifications. For a John Deere model R4038 with 120 feet steel booms, the −SAT is approximately −5° and the −TRT is approximately −10°/sec. As an example, implementing the method 600 shown in FIG. 6A on a John Deere R4038 results in the vehicle heading being compared to a −SAT of −5° and the vehicle turn rate being compared to a −TRT of 10°/sec.

In the flow diagram shown in FIG. 6A, evaluation steps 622b and 624b are connected in series because, when operating an agricultural sprayer vehicle during a headland turn, a negative vehicle heading and a negative vehicle turn rate indicate a left-handed turn. As an example, a left-handed turn can cause lateral boom acceleration resulting in boom roll.

In this implementation, method steps 650a and 650b represent two paths which perform the same general function—controlling air pressure in one or more air springs (e.g., 352a, 352b), to adjust the position of the center frame (e.g., 202) of the agricultural sprayer vehicle. But, steps 650a and 650b define different paths because each addresses a different magnitude of vehicle turn rate and vehicle heading.

FIG. 6B is a flow diagram illustrating an example implementation of a method 650a for adjusting the position of a suspended center frame (e.g., 202) of an agricultural sprayer vehicle using a CFP system (e.g., 100), applied to a headland turn event resulting in lateral boom acceleration and boom roll. At 652, the control device (e.g., 110) sets a target pressure, or target force, for the right air spring (right target) (e.g., 352b) to an upper air pressure 1 (UAP1) and the control device (e.g., 110) sets a target pressure, or target force, for the left air spring (left target) (e.g., 352a) to an upper air pressure 2 (UAP2). The values of the UAP1 and UAP2 can vary depending on data taken in the field as well as the agricultural sprayer vehicle specifications. As an example, the control device (e.g., 110) can set the target pressure to a value reflecting the force necessary for an air spring (e.g., 352a, 352b) to move the suspended center frame (e.g., 202). For a John Deere model R4038 with 120 feet steel booms, UAP1 can be set at approximately 60 psi and UAP2 can be set at approximately 80 psi. Once the left and right air spring target pressures (left target and right target) are set to UAP2 and UAP1 respectively at 652, the evaluation steps 654a and 654b are performed. Evaluation steps 654a and 654b may be performed concurrently, in parallel.

At 654a, the control device (e.g., 110) compares a detected air spring force such as, for example, the right air spring pressure (right) (e.g., 352b) to a preset target force for the right air spring (e.g., 352b) such as, for example, the right air spring target pressure (previously set to UAP1). As an example, the result of the comparison by the control device (e.g., 110) determines whether a right air spring inflate valve (e.g., 358b) is opened or closed. In this implementation, if the right air spring pressure (right) (e.g., 352b) is less than the right air spring target pressure (right target), method 600 proceeds to step 656a in which the right air spring inflate valve (e.g., 358b) is opened. In some implementations, the right air spring inflate valve (e.g., 358b) opens in response to receiving an actuator adjustment command from the control device (e.g., 110). After opening the right air spring inflate valve (e.g., 358b) at 656a, the method 600 loops back to evaluation step 654a, wherein the control device (e.g., 110) compares the right air spring pressure (right) (e.g., 352b) to the right air spring target pressure (right target). As long as the right air spring pressure (right) (e.g., 352b) continues to be less than the right air spring target pressure (right target) in the evaluation step at 654a, the step 656a of opening the right air spring inflate valve (e.g. 358b) continues to be performed.

In this implementation, if the control device (e.g., 110) determines the right air spring pressure (right) (e.g., 352b) is not less than the right air spring target pressure (right target), the method 600 proceeds to step 656b in which the right air spring inflate valve (e.g. 358b) is closed. In some implementations, the right air spring inflate valve (e.g., 358b) closes in response to receiving an actuator adjustment command from the control device (e.g., 110). After closing the right air spring inflate valve (e.g. 358b), the method 600 proceeds to step 660, which comprises a bi-conditional comparison.

At 654b, the control device (e.g., 110) compares a detected air spring force such as, for example, the left air spring pressure (left) (e.g., 352a) to a preset target force for the left air spring (e.g., 352a) such as, for example, the left air spring target pressure (previously set to UAP2). As an example, the result of the comparison by the control device (e.g., 110) determines whether a left air spring inflate valve (e.g., 358a) is opened or closed. In this implementation, if the left air spring pressure (left) (e.g., 352a) is less than the left air spring target pressure (left target), method 600 proceeds to step 658a in which the left air spring inflate valve (e.g., 358a) is opened. In some implementations, the left air spring inflate valve (e.g., 358a) opens in response to receiving an actuator adjustment command from the control device (e.g., 110). After opening the left air spring inflate valve (e.g., 358a) at 658a, the method 600 loops back to evaluation step 654b, wherein the control device (e.g., 110) compares the left air spring pressure (left) (e.g., 352a) to the left air spring target pressure (left target). As long as the left air spring pressure (left) (e.g., 352a) continues to be less than the left air spring target pressure (left target) in the evaluation step at 654b, the step 658a of opening the left air spring inflate valve (e.g., 358a) continues to be performed.

In this implementation, if the control device (e.g., 110) determines left air spring pressure (left) (e.g., 352a) is not less than the left air spring target pressure (left target), the method 600 proceeds to step 658b in which the left air spring inflate valve (e.g., 358a) is closed. In some implementations, the left air spring inflate valve (e.g., 358a) closes in response to receiving an actuator adjustment command from the control device (e.g., 110). After closing the left air spring inflate valve (e.g., 358a), the method 600 proceeds to step 660, which comprises a bi-conditional comparison.

At 660, is a bi-conditional comparison in which the control device (e.g., 110) compares the left air spring pressure (left) (e.g., 352a) to the left air spring target pressure (left target) and the control device (e.g., 110) compares the right air spring pressure (right) (e.g., 352b) to the right air spring target pressure (right target). In this implementation, if the control device (e.g., 110) determines that both the left air spring pressure (left) (e.g., 352a) is greater than the left air spring target pressure (left target) and the right air spring pressure (right) (e.g., 352b) is greater than the right air spring target pressure (right target), then method 600 proceeds to step 662. Thus, in order to proceed to step 662, both conditions described above must be true (e.g., left>left target and right>right target). If not, method 600 loops back to evaluation steps 654a and 654b.

The purpose of the bi-conditional evaluation step at 662 is to require both conditions to be true to advance (e.g., the left air spring pressure has exceeded the left air spring target pressure (UAP2) and the right air spring pressure has exceeded the right air spring target pressure (UAP1)). As noted above, positive vehicle heading and positive vehicle turn rate (i.e., a right-handed turn) can cause lateral boom acceleration resulting in positive boom roll. As an example, during a right turn, the boom inertia moves towards the left boom wing. In order to offset the direction of boom roll (e.g., left), the left air spring pressure (e.g., 352a) should be set to a higher value to mitigate the boom roll. To offset the boom roll in the John Deere model R4038, the left air spring pressure (e.g., 352a) is increased to over 80 psi (the left air spring target pressure (UAP2) set in step 652) to mitigate the initial lateral acceleration of the booms and the right air spring pressure (e.g., 352b) is increased to over 60 psi (the right air spring target pressure (UAP1) set in step 652) to try to keep the boom centered as the boom rolls back towards its rest position.

At 662, the control device (e.g., 110) compares the vehicle heading to the +SAT. In this implementation, if the control device (e.g., 110) determines the vehicle heading is not less than the +SAT, a step 664 of checking the vehicle heading occurs. The evaluation step at 662 and the checking step at 664 may form a loop that is not broken until the vehicle heading is less than the +SAT.

Once the control device (e.g., 110) determines the vehicle heading is less than the +SAT, the method 600 proceeds to step 666. At 666, the control device (e.g., 110) sets a target pressure, or target force, for the right air spring (right target) to a standard air pressure (SAP) and the control device (e.g., 110) sets a target pressure, or target force, for the left air spring target pressure (left target) to a standard air pressure (SAP). The value of SAP can vary depending on data taken in the field as well as the agricultural sprayer vehicle specifications. As an example, the control device (e.g., 110) can set the target pressure to a value reflecting the force necessary for an air spring (e.g., 352a, 352b) to move the suspended center frame (e.g., 202). For example, a John Deere model R4038 with 120 feet steel booms, the SAP can be set at approximately 20 psi. Once both the left and right air spring target pressures (left target and right target) are set to SAP at 666, evaluation steps 668a and 668b are performed. Evaluation steps 668a and 668b may be performed concurrently, in parallel.

At 668a, the control device (e.g., 110) compares a detected air spring force such as, for example, the right air spring pressure (right) (e.g., 352b) to a preset target force for the right air spring (e.g., 352b) such as, for example, the right air spring target pressure (previously set to SAP). As an example, the result of the comparison by the control device (e.g., 110) determines whether a right air spring exhaust valve (e.g., 356b) is opened or closed. In this implementation, if the right air spring pressure (right) (e.g., 352b) is greater than the right air spring target pressure (right target), the method 600 proceeds to step 670a in which the right air spring exhaust valve (e.g., 356b) is opened. In some implementations, the right air spring exhaust valve (e.g., 356b) opens in response to receiving an actuator adjustment command from the control device (e.g., 110). After opening the right air spring exhaust valve (e.g., 356b) at 670a, the method 600 loops back to evaluation step 668a, wherein the control device (e.g., 110) compares the right air spring pressure (right) (e.g., 352b) to the right air spring target pressure (right target). As long as the right air spring pressure (right) (e.g., 352b) continues to be greater than the right air spring target pressure (right target) in the evaluation step 668a, the step 670a of opening the right air spring exhaust valve (e.g., 356b) continues to be performed.

In this implementation, if the right air spring pressure (right) (e.g., 352b) is not greater than the right air spring target pressure (right target), the method 600 proceeds to step 670b in which the right air spring exhaust valve (e.g., 356b) is closed. In some implementations, the right air spring exhaust valve (e.g., 356b) closes in response to receiving an actuator adjustment command from the control device (e.g., 110). After closing the right air spring exhaust valve (e.g., 356b), the method 600 proceeds to step 674, which comprises a bi-conditional comparison.

At 668b, the control device (e.g., 110) compares a detected air spring force such as, for example, the left air spring pressure (left) (e.g., 352a) to a preset target force for the left air spring (e.g., 352a) such as, for example, the left air spring target pressure (previously set to SAP). As an example, the result of the comparison by the control device (e.g., 110) determines whether a left air spring exhaust valve (e.g., 356a) is opened or closed. In this implementation, if the left air spring pressure (e.g., 352a) is greater than the left air spring target pressure (left target), the method 600 proceeds to step 672a in which the left air spring exhaust valve (e.g., 356a) is opened. In some implementations, the left air spring exhaust valve (e.g., 356a) opens in response to receiving an actuator adjustment command from the control device (e.g., 110). After opening the left air spring exhaust valve (e.g., 356a) at 672a, the method 600 loops back to evaluation step 668b, wherein the control device (e.g., 110) compares the left air spring pressure (left) (e.g., 352a) to the left air spring target pressure (left target). As long as the left air spring pressure (left) (e.g., 352a) continues to be greater than the left air spring target pressure (left target) in the evaluation step at 668b, the step 672a of opening the left air spring exhaust valve (e.g., 356a) continues to be performed.

In this implementation, if the left air spring pressure (left) (e.g., 352a) is not greater than the left air spring target pressure (left target), the method 600 proceeds to step 672b in which the left air spring exhaust valve (e.g., 356a) is closed. In some implementations, the left air spring exhaust valve (e.g., 356a) closes in response to receiving an actuator adjustment command from the control device (e.g., 110). After closing the left air spring exhaust valve (e.g., 356a), the method 600 proceeds to step 674, which comprises a bi-conditional comparison.

At 674, is a bi-conditional comparison in which the control device (e.g., 110) compares the left air spring pressure (left) (e.g., 352a) to the left air spring target pressure (left target) and the control device (e.g., 110) compares the right air spring pressure (right) (e.g., 352b) to the right air spring target pressure (right target). In this implementation, if the control device (e.g., 110) determines that both the left air spring pressure (left) (e.g., 352a) is less than the left air spring target pressure (left target) and the right air spring pressure (right) (e.g., 352b) is less than the right air spring target pressure (right target), then the control device (e.g., 110) determines the boom has been repositioned and the method 600 starts over. Thus, in order to finish a cycle of boom adjustment according to method 600 and, in particular, to variation 650a, both conditions described above must be true (e.g., left<left target and right<right target). If not, method 600 loops back to evaluation steps 668a and 668b.

The purpose of the bi-conditional evaluation step at 674 is to require both conditions to be true to advance (e.g., the left air spring pressure has not exceeded the left air spring target pressure (SAP) and the right air spring pressure has not exceeded the right air spring target pressure (SAP)) indicating that the boom has been repositioned closer to its normal rest position.

FIG. 6C is a flow diagram illustrating an example implementation of a method 650b for adjusting the position of a suspended center frame (e.g., 202) of an agricultural sprayer vehicle using a CFP system (e.g., 100), applied to a headland turn event resulting in lateral boom acceleration and boom roll. At 676, the control device (e.g., 110) sets a target pressure, or target force, for the right air spring (right target) (e.g., 352b) to an upper air pressure 2 (UAP2) and the control device (e.g., 110) sets a target pressure, or target force, for the left air spring (left target) (e.g., 352a) to an upper air pressure 1 (UAP1). The values of the UAP1 and UAP2 can vary depending on data taken in the field as well as the agricultural sprayer vehicle specifications. As an example, the control device (e.g., 110) can set the target pressure to a value reflecting the force necessary for an air spring (e.g., 352a, 352b) to move the suspended center frame (e.g., 202). For a John Deere model R4038 with 120 feet steel booms, UAP1 can be set to approximately 60 psi and UAP2 can be set to approximately 80 psi. Once the left and right air spring target pressures (left target and right target) are set to UAP1 and UAP2 respectively at 676, evaluation steps 678a and 678b are performed. Evaluation steps 678a and 678b may be performed concurrently, in parallel.

At 678a, the control device (e.g., 110) compares a detected air spring force such as, for example, the right air spring pressure (right) (e.g., 352b) to a preset target force for the right air spring (e.g., 352b) such as, for example, the right air spring target pressure (previously set to UAP2). As an example, the result of the comparison by the control device (e.g., 110) determines whether a right air spring inflate valve (e.g., 358b) is opened or closed. In this implementation, if the right air spring pressure (right) (e.g., 352b) is less than the right air spring target pressure (right target), method 600 proceeds to step 680a in which the right air spring inflate valve (e.g., 358b) is opened. In some implementations, the right air spring inflate valve (e.g., 358b) opens in response to receiving an actuator adjustment command from the control device (e.g., 110). After opening the right air spring inflate valve (e.g., 358b) at 680a, the method 600 loops back to evaluation step 678a, wherein the control device (e.g., 110) compares the right air spring pressure (right) (e.g., 352b) to the right air spring target pressure (right target). As long as the right air spring pressure (right) (e.g., 352b) continues to be less than the right air spring target pressure (right target) in the evaluation step at 678a, the step 680a of opening the right air spring inflate valve (e.g., 358b) continues to be performed.

In this implementation, if the control device (e.g., 110) determines the right air spring pressure (right) (e.g., 352b) is not less than the right air spring target pressure (right target), the method 600 proceeds to 680b in which the right air spring inflate valve (e.g., 358b) is closed. In some implementations, the right air spring inflate valve (e.g., 358b) closes in response to receiving an actuator adjustment command from the control device (e.g., 110). After closing the right air spring inflate valve (e.g., 358b), the method 600 proceeds to step 684, which comprises a bi-conditional comparison.

At 678b, the control device (e.g., 110) compares a detected air spring force such as, for example, the left air spring pressure (left) (e.g., 352a) to a preset target force for the left air spring (e.g., 352a) such as, for example, the left air spring target pressure (previously set to UAP1). As an example, the result of the comparison by the control device (e.g., 110) determines whether a left air spring inflate valve (e.g., 358a) is opened or closed. In this implementation, if the left air spring pressure (left) (e.g., 352a) is less than the left air spring target pressure (left target), the method 600 proceeds to step 682a in which the left air spring inflate valve (e.g., 358a) is opened. In some implementations, the left air spring inflate valve (e.g., 358a) opens in response to receiving an actuator adjustment command from the control device (e.g., 110). After opening the left air spring inflate valve (e.g., 358a) at 682a, the method 600 loops back to evaluation step 678b, wherein the control device (e.g., 110) compares the left air spring pressure (left) (e.g., 352a) to the left air spring target pressure (left target). As long as the left air spring pressure (left) (e.g., 352a) continues to be less than the left air spring target pressure (left target) in the evaluation step at 678b, the step 682a of opening the left air spring inflate valve (e.g., 358a) continues to be performed.

In this implementation, if the control device (e.g., 110) determines the left air spring pressure (left) (e.g., 352a) is not less than the left air spring target pressure (left target), the method 600 proceeds to step 682b in which the left air spring inflate valve (e.g., 358a) is closed. In some implementations, the left air spring inflate valve (e.g., 358a) closes in response to receiving an actuator adjustment command from the control device (e.g., 110). After closing the left air spring inflate valve (e.g., 358a), the method 600 proceeds to another evaluation step 684, which comprises a bi-conditional comparison.

At 684, is a bi-conditional comparison in which the control device (e.g., 110) compares the left air spring pressure (left) (e.g., 352a) to the left air spring target pressure (left target) and the control device (e.g., 110) compares the right air spring pressure (right) (e.g., 352b) to the right air spring target pressure (right target). In this implementation, if the control device (e.g., 110) determines that both the left air spring pressure (left) (e.g., 352a) is greater than the left air spring target pressure (left target) and the right air spring pressure (right) (e.g., 352b) is greater than the right air spring target pressure (right target), then method 600 proceeds to step 686. Thus, in order to proceed to step 686, both conditions described above must be true (e.g., left>left target and right>right target). If not, method 600 loops back to evaluation steps 678a and 678b.

The purpose of the bi-conditional evaluation step at 684 is to require both conditions to be true to advance (e.g., the left air spring pressure has exceeded the left air spring target pressure (UAP1) and the right air spring pressure has exceeded the right air spring target pressure (UAP2)). As noted above, negative vehicle heading and negative vehicle steer rate (e.g., a left-handed turn) can cause lateral boom acceleration. As an example, during a left turn, the boom inertia moves towards the right wing of the boom. In order to offset the direction boom roll (e.g., right), the right air spring pressure (e.g., 352b) should be set to a higher value to mitigate the boom roll. To offset the boom roll in the John Deere model R4038, the left air spring pressure (e.g., 352a) is increased to over 60 psi (the left air spring target pressure (UAP1) set in step 676) to mitigate the initial lateral acceleration of the booms and the right air spring pressure (e.g., 352b) is increased to over 80 psi (the right air spring target pressure (UAP2) set in step 676) to try to keep the boom centered as the boom rolls back towards its rest position.

At 686, the control device (e.g., 110) compares the vehicle heading to the −SAT. In this implementation, if the control device (e.g., 110) determines the vehicle heading is not greater than the −SAT, a step 688 of checking the vehicle heading occurs. The evaluation step at 686 and the checking step at 688 may form a loop that is not broken until the vehicle heading is greater than the −SAT.

Once the control device (e.g., 110) determines the vehicle heading is greater than the −SAT, the method 600 proceeds to step 690. At 690, the control device (e.g., 110) sets a target pressure, or target force, for the right air spring target pressure (right target) to a standard air pressure (SAP) and the control device (e.g., 110) sets a target pressure, or target force, for the left air spring target pressure (left target) to a standard air pressure (SAP). The value of SAP can vary depending on data taken in the field as well as the agricultural sprayer vehicle specifications. As an example, the control device (e.g., 110) can set the target pressure to a value reflecting the force necessary for an air spring (e.g., 352a, 352b) to move the suspended center frame (e.g., 202). For a John Deere model R4038 with 120 feet steel booms, the SAP can be set at approximately 20 psi. Once both the left and right air spring target pressures (left target and right target) are set to SAP at 690, evaluation steps 692a and 692b are performed. Evaluation steps 692a and 692b may be performed concurrently, in parallel.

At 692a, the control device (e.g., 110) compares a detected air spring force such as, for example, the right air spring pressure (right) (e.g., 352b) to a preset target force for the right air spring (e.g., 352b) such as, for example, the right air spring target pressure (previously set to SAP). As an example, the result of the comparison by the control device (e.g., 110) determines whether a right air spring exhaust valve (e.g., 356b) is opened or closed. In this implementation, if the right air spring pressure (right) (e.g., 352b) is greater than the right air spring target pressure (right target), the method 600 proceeds to step 694a in which the right air spring exhaust valve (e.g., 356b) is opened. In some implementations, the right air spring exhaust valve (e.g., 356b) opens in response to receiving an actuator adjustment command from the control device (e.g., 110). After opening the right air spring exhaust valve (e.g., 356b) at 694a, the method 600 loops back to evaluation step 692a, wherein the control device (e.g., 110) compares the right air spring pressure (right) (e.g., 352b) to the right air spring target pressure (right target). As long as the right air spring pressure (right) (e.g., 352b) continues to be greater than the right air spring target pressure (right target) in the evaluation step 692a, the step 694a of opening the right air spring exhaust valve (e.g., 356b) continues to be performed.

In this implementation, if the control device (e.g., 110) determines the right air spring pressure (right) (e.g., 352b) is not greater than the right air spring target pressure (right target), the method 600 proceeds to step 694b in which the right air spring exhaust valve (e.g., 356b) is closed. In some implementations, the right air spring exhaust valve (e.g., 356b) closes in response to receiving an actuator adjustment command from the control device (e.g., 110). After closing the right air spring exhaust valve (e.g., 356b), the method 600 proceeds to evaluation step 698, which comprises a bi-conditional comparison.

At 692b, the control device (e.g., 110) compares a detected air spring force such as, for example, the left air spring pressure (left) (e.g., 352a) to a preset target force for the left air spring (e.g., 352a) such as, for example, the left air spring target pressure (previously set to SAP). As an example, the result of the comparison by the control device (e.g., 110) determines whether a left air spring exhaust valve (e.g., 356a) is opened or closed. In this implementation, if the left air spring pressure (left) (e.g., 352a) is greater than the left air spring target pressure (left target), the method 600 proceeds to step 696a in which the left air spring exhaust valve (e.g., 356a) is opened. In some implementations, the left air spring exhaust valve (e.g., 356a) opens in response to receiving an actuator adjustment command from the control device (e.g., 110). After opening the left air spring exhaust valve (e.g., 356a) at 696a, the method 600 loops back to evaluation step 692b, wherein the control device (e.g., 110) compares the left air spring pressure (left) (e.g., 352a) to the left air spring target pressure (left target). As long as the left air spring pressure (left) (e.g., 352a) continues to be greater than the left air spring target pressure (left target) in the evaluation step 692b, the step 696a of opening the left air spring exhaust valve (e.g., 356a) continues to be performed.

In this implementation, if the control device (e.g., 110) determines the left air spring pressure (left) (e.g., 352a) is not greater than the left air spring target pressure (left target) at 692b, the method 600 proceeds to step 696b in which the left air spring exhaust valve (e.g., 356a) is closed. In some implementations, the left air spring exhaust valve (e.g., 356a) closes in response to receiving an actuator adjustment command from the control device (e.g., 110). After closing the left air spring exhaust valve (e.g., 356a), the method 600 proceeds to step 698, which comprises a bi-conditional comparison.

At 698, is a bi-conditional comparison in which the control device (e.g., 110) compares the left air spring pressure (left) (e.g., 352a) to the left air spring target pressure (left target) and the control device (e.g., 110) compares the right air spring pressure (right) (e.g., 352b) to the right air spring target pressure (right target). In this implementation, if the control device (e.g., 110) determines that both the left air spring pressure (left) (e.g., 352a) is less than the left air spring target pressure (left target) and the right air spring pressure (right) (e.g., 352b) is less than the right air spring target pressure (right target), then the control device (e.g., 110) determines the boom has been repositioned and the method 600 starts over. Thus, in order to finish a cycle of boom adjustment according to method 600 and, in particular, to variation 650b, both conditions described above must be true (e.g., left<left target and right<right target). If not, method 600 loops back to evaluation steps 692a and 692b.

The purpose of the bi-conditional evaluation step at 698 is to require both conditions to be true to advance (e.g., the left air spring pressure has not exceeded the left air spring target pressure (SAP) and the right air spring pressure has not exceeded the right air spring target pressure (SAP)) indicating that the boom has been repositioned closer to its normal rest position.

FIG. 7 illustrates an agricultural sprayer vehicle 700 equipped with a CFP system (e.g., 100) to adjust the position of a suspended center frame 702. A pair of boom wings 705, 707, or sprayer boom arms, are attached to the suspended center frame 702. A fixed frame 716 can be engaged with the agricultural sprayer vehicle 700 (e.g., self-propelled or towed), and the suspended frame 702 can be pivotably engaged with the fixed frame 716. During operation, for example, as the agricultural sprayer vehicle 700 traverses a field, the agricultural sprayer vehicle 700 engaged with the fixed frame 716 may roll from side to side, pitch up and down, and turn from side to side. In this example, the inertia of the suspended center frame 702 and coupled boom wings 705, 707 can result in the suspended center frame 702 pivoting in a pitch, roll and/or yaw axis with respect to the fixed frame 716. In this example, in an effort to keep the boom wings 705, 707 relatively parallel to the ground when traveling over uneven ground, along the side of a hill, or in a turn, the control device (e.g., 110) of the CFP system (e.g., 100) can provide actuator adjustment commands the one or more actuators (e.g., 252a, 252b) to adjust the position of the suspended center frame 702 with respect to the fixed frame 716.

In some implementations, the agricultural sprayer vehicle 700 is equipped with a CFP system (e.g., 100) further comprising a user interface 709. The user interface 709 can be disposed proximate an operator position in the agricultural sprayer vehicle 700. In some implementations, the user interface 709 can be configured to operably display information indicative of the distance of the boom 705, 707 from the ground, and the user interface 709 can be further configured to operably transmit data indicative of user input to the control device (e.g., 110).

The advantages of this disclosure in relation to the boom height system should be readily apparent. The CFP system 100 and general method 400 provide for a more controllable suspended center frame resulting in better-controlled nozzle positioning and less variability in boom height thereby improving the overall performance of the boom height system. Improving the performance of the boom height control system provides direct agronomic and environmental benefits through reduced droplet drift and improved performance of camera-based weed sensing systems that are sensitive to camera positioning relative to the ground.

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A center frame positioning system for an agricultural sprayer vehicle, the system comprising:
    one or more controllable, variable pressure actuators that each are configured to operably exert a force on a suspended center frame of the agricultural sprayer vehicle, wherein a sprayer boom is attached to the suspended center frame;
    one or more sensors that provide center frame position data indicative of a detected operable position of the suspended center frame, wherein the center frame position data comprises one or more of: a vehicle heading, a vehicle turn rate, a vehicle speed, a vehicle chassis roll; a boom roll of the sprayer boom, and a lift actuation provided by the one or more actuators; and
    a control device that receives the center frame position data and provides one or more actuator adjustment commands based at least upon the received center frame position data;
        wherein the control device determines one or more of: a chassis roll moving average of the vehicle, and a boom roll moving average of the boom coupled with the center frame; and
        wherein the control device further determines whether to provide an actuator adjustment command to adjust the position of the center frame based at least on the control device performing one or more of:
            comparing the vehicle speed to a predetermined vehicle speed threshold;
            comparing the vehicle chassis roll moving average to a predetermined vehicle chassis roll threshold; and
            comparing the boom roll moving average to a predetermined boom roll threshold;
    wherein the force exerted on the suspended center frame by the one or more actuators is operably adjusted as a result of the one or more actuator adjustment commands; and
    wherein adjustment of the force exerted on the center frame results in adjustment of a distance of the sprayer boom from the ground.

2. The system of claim 1, wherein the one or more actuators comprises a first actuator disposed on a first side of the suspended center frame, and a second actuator disposed on a second side of the suspended center frame, which is opposed to the first side.

3. The system of claim 1, wherein the respective one or more actuators comprises an air spring; and
    the center frame positioning system further comprises:
        an exhaust valve, the exhaust valve operably releasing air from the air spring to reduce the force exerted, and
        an inflate valve, the inflate valve operably receiving air into the air spring to increase the force exerted.

4. The system of claim 3, further comprising an air spring force detecting sensor, wherein the control device further:

compares a detected air spring force in the respective one or more air springs to a preset target force for the respective one or more air springs; and provides a command to adjust the force exerted on the center frame, if needed, for the respective one or more air springs based at least on the comparing the detected air spring force to the preset target force.

5. The system of claim 1, wherein the respective one or more actuators comprise one or more of:
   a hydraulic cylinder;
   a pneumatic cylinder;
   an electric linear actuator;
   an electric motor; and
   a hydraulic motor.

6. The system of claim 1, the control device further determining whether to provide an actuator adjustment command to adjust the position of the center frame based at least on the control device performing one or more of:
   comparing the vehicle heading to a predetermined vehicle heading threshold; and
   comparing the vehicle turn rate to a predetermined vehicle turn rate threshold.

7. The system of claim 1, the control device comprising one or more of:
   a processor that processes received data based at least on stored programmable logic;
   a memory device that stores the programmable logic, and/or received data; and
   a communication interface that receives incoming data and transmits outgoing data.

8. The system of claim 1, further comprising a user interface disposed proximate an operator position in the vehicle, the user interface operably displaying information indicative of the distance of the boom from the ground, and the user interface operably transmitting data indicative of user input to the controller.

9. A center frame positioning system for an agricultural sprayer vehicle, the system comprising:
   a first actuator disposed on a first side of a suspended center frame of an agricultural sprayer vehicle, and a second actuator disposed on a second side of the suspended center frame, the first actuator configured to operably apply a first force to the suspended center frame to rotate the suspended center frame in a first direction, and the second actuator configured to operably apply a second force to the suspended center frame to rotate the suspended center frame in a second direction, wherein one or more sprayer boom arms are attached to the suspended center frame and operably extended over the ground;
   a center frame position sensor operably detecting the real time rotational position of the suspended center frame relative to the vehicle;
   one or more vehicle sensors, the one or more vehicle sensor providing vehicle sensor data to the central controller indicative of one or more of: real-time vehicle heading, real-time vehicle turn rate, real-time vehicle speed, and real-time vehicle chassis roll; and
   a central controller comprising a computer processor and computer data storage, the central controller operably processing data indicative of the detected real time rotational position of the center frame and the vehicle data using programmable logic stored in the computer data storage to generate an actuator adjustment command for the first actuator and the second actuator, the actuator adjustment command resulting in an adjustment of the first force applied by the first actuator and the second force applied by the second actuator;
   wherein the adjustment of the first force applied by the first actuator and the adjustment of the second force applied by the second actuator results in an adjustment of a distance of the one or more sprayer boom arms from the ground.

10. The system of claim 9, wherein the first actuator and/or the second actuator comprise one of:
    an air spring;
    a hydraulic cylinder;
    a pneumatic cylinder;
    an electric linear actuator;
    an electric motor; and
    a hydraulic motor.

11. The system of claim 10, wherein the first actuator comprises an air spring and the second actuator comprises an air spring, the system further comprising an air spring force detecting sensor, wherein the controller further:
    compares a detected air spring force in respective air springs to a preset target force for the respective air springs; and
    provides a command to adjust inflation of respective air springs based at least on the comparing the detected air spring force to the preset target force.

12. The system of claim 9, wherein the one or more vehicle sensor provide data to the central controller indicative of one or more of: real-time boom roll of one or more sprayer boom arms, and real-time lift actuation provided by the respective actuators.

13. The system of claim 12, wherein the controller uses the vehicle data to determines one or more of: a chassis roll moving average of the vehicle, and a boom roll moving average of the one or more sprayer boom arms.

14. The system of claim 13, wherein the controller further determines whether to provide the actuator adjustment command to adjust the position of the center frame based at least on the controller performing one or more of:
    comparing the vehicle speed to a predetermined vehicle speed threshold;
    comparing the vehicle chassis roll moving average to a predetermined vehicle chassis roll threshold; and
    comparing the boom roll moving average to a predetermined boom roll threshold.

15. The system of claim 12, the controller further determining whether to provide an actuator adjustment commend to adjust the position of the center frame based at least on the controller performing one or more of:
    comparing the vehicle heading to a predetermined vehicle heading threshold; and
    comparing the turn rate to a predetermined vehicle turn rate threshold.

16. A center frame positioning method for an agricultural sprayer, the method comprising:
    activating a center frame positioning system, the center frame positioning system comprising one or more controllable, variable pressure actuators that each operably exert a force on a suspended center frame of an agricultural sprayer vehicle, wherein a sprayer boom is attached to the suspended center frame;
    using a central controller, comprising a processor and memory, to collect and process position data indicative of a rotational position of the suspended center frame relative to the agricultural sprayer vehicle, wherein the position data is operably provided by one or more position sensors, wherein the position data comprises one or more of: a vehicle heading, a vehicle turn rate, a vehicle speed, a vehicle chassis roll; a boom roll of the sprayer boom, and a lift actuation provided by the one or more actuators;

using programmable logic in the central controller to evaluate the position data to determine whether an adjustment to the position of the suspended center frame is needed; and controlling actuator force provided by at least one of the one or more actuators to adjust the position of the suspended center frame based on the evaluating the position data:

wherein the central controller determines one or more of: a chassis roll moving average of the vehicle, and a boom roll moving average of the boom coupled with the center frame; and wherein the central controller further determines whether to provide an actuator adjustment command to adjust the position of the center frame based at least on the control device performing one or more of:
comparing the vehicle speed to a predetermined vehicle speed threshold;
comparing the vehicle chassis roll moving average to a predetermined vehicle chassis roll threshold; and
comparing the boom roll moving average to a predetermined boom roll threshold.

17. The method of claim 16, wherein the position data includes vehicle heading, turn rate, vehicle speed, vehicle chassis roll, boom roll of the boom, lift actuation provided by the at least one or more actuators, and the method further comprises:
determining a chassis roll moving average of the agricultural sprayer vehicle;
determining a boom roll moving average of the boom;
comparing vehicle speed to a predetermined vehicle speed threshold to determine whether an adjustment to the position of the suspended center frame is needed;
comparing the vehicle chassis roll moving average to a predetermined vehicle chassis roll threshold to determine whether an adjustment to the position of the suspended center frame is needed; and
comparing the boom roll moving average to a predetermined boom roll threshold to determine whether an adjustment to the position of the suspended center frame is needed.

* * * * *